(12) United States Patent
Seki

(10) Patent No.: US 11,448,320 B2
(45) Date of Patent: Sep. 20, 2022

(54) SEALING DEVICE

(71) Applicant: NOK CORPORATION, Tokyo (JP)

(72) Inventor: Masahiro Seki, Fukushima (JP)

(73) Assignee: NOK CORPORATION

( * ) Notice: Subject to any disclaimer, the term of this patent is extended or adjusted under 35 U.S.C. 154(b) by 144 days.

(21) Appl. No.: 16/959,777

(22) PCT Filed: Apr. 3, 2019

(86) PCT No.: PCT/JP2019/014771
§ 371 (c)(1),
(2) Date: Jul. 2, 2020

(87) PCT Pub. No.: WO2019/194219
PCT Pub. Date: Oct. 10, 2019

(65) Prior Publication Data
US 2020/0362967 A1    Nov. 19, 2020

(30) Foreign Application Priority Data

Apr. 4, 2018 (JP) .............................. JP2018-072536

(51) Int. Cl.
*F16J 15/3204* (2016.01)
*F16C 33/78* (2006.01)

(52) U.S. Cl.
CPC ........... *F16J 15/3204* (2013.01); *F16C 33/78* (2013.01); *F16C 33/7816* (2013.01); *F16C 33/783* (2013.01); *F16C 33/7823* (2013.01)

(58) Field of Classification Search
CPC .. F16J 15/3252; F16J 15/3268; F16J 15/3284; F16C 33/782; F16C 33/783; F16C 33/7869; F16C 33/7873; F16C 33/7876
See application file for complete search history.

(56) References Cited

U.S. PATENT DOCUMENTS 6,637,754 B1 * 10/2003 Ohtsuki ................ F16C 19/186
                                                           277/549
6,979,001 B2 * 12/2005 Ohtsuki ................ F16C 19/186
                                                           277/549

(Continued)

FOREIGN PATENT DOCUMENTS

EP    2184519 A1    5/2010
EP    3040566 A1    7/2016

(Continued)

OTHER PUBLICATIONS

Extended European Search Report for corresponding Application No. EP 19781615.0 dated Mar. 31, 2021 (7 Pages).

(Continued)

*Primary Examiner* — Nicholas L Foster
(74) *Attorney, Agent, or Firm* — Harness, Dickey & Pierce, P.L.C.

(57) ABSTRACT

A sealing device is located between an inner member and an outer member that rotate relative to each other. The sealing device includes a tubular part that is to be mounted on a cylindrical end portion of the outer member, an annular part connected to an end of the tubular part and having a portion located radially inside the end portion of the outer member, at least one lip extending from the annular part toward the inner member. Each of the annular part and the tubular part includes an elastic part and a rigid part. At least one of an upper surface of the annular part that is opposite to the tubular part and a lower surface of the tubular part that is opposite to the annular part is formed of the elastic part. Multiple protrusions are formed on at least one of the upper surface of the annular part and the lower surface of the tubular part, the protrusions protruding along an axial direction of the sealing device. The multiple protrusions are (Continued)

arranged on a circle centered on the central axis and spaced apart from each other.

14 Claims, 14 Drawing Sheets

(56) References Cited

U.S. PATENT DOCUMENTS

| | | | | |
|---|---|---|---|---|
| 8,231,129 B2* | 7/2012 | Kobayashi | ......... | F16C 33/7876 277/346 |
| 9,683,662 B2* | 6/2017 | Kanzaki | ............. | F16C 33/7876 |
| 2004/0086212 A1* | 5/2004 | Ohtsuki | .............. | F16J 15/3264 384/448 |
| 2009/0256316 A1* | 10/2009 | Kanzaki | ............. | F16C 33/7876 277/562 |
| 2010/0007090 A1* | 1/2010 | Kobayashi | .......... | F16C 41/007 277/351 |
| 2010/0066029 A1* | 3/2010 | Kobayashi | .......... | F16J 15/3232 277/361 |

FOREIGN PATENT DOCUMENTS

| | | |
|---|---|---|
| JP | H10-318269 A | 12/1998 |
| JP | 2008-281013 A | 11/2008 |
| JP | 2009-008104 A | 1/2009 |
| JP | 2014-139451 A | 7/2014 |
| JP | 2015-042879 A | 3/2015 |

OTHER PUBLICATIONS

Japanese Office Action for corresponding Japanese Application No. 2020-512282 dated Jul. 27, 2021 with English translation (10 Pages).

First Chinese Office Action for corresponding Application No. 201980010038.8 dated Nov. 18, 2021, with English translation (11 Pages).

* cited by examiner

Fig. 32

| TYPE OF SEALING DEVICE | FIRST TYPE | | SECOND TYPE | | THIRD TYPE | | FOURTH TYPE | |
|---|---|---|---|---|---|---|---|---|
| NUMBER OF PROTRUSIONS | 0 | | 4 | | 8 | | 24 | |
| CONTACT AREA RATIO (%) | 100.0 | | 5.0 | | 8.9 | | 19.3 | |
| ARRANGEMENT PATTERN OF PROTRUSIONS | — | | 4 GROUPS EACH CONSTITUTED OF ONE PROTRUSION | | 8 GROUPS EACH CONSTITUTED OF ONE PROTRUSION | | 8 GROUPS EACH CONSTITUTED OF 3 PROTRUSIONS | |
| LOAD(kgf) | 0.60 | 1.97 | 0.60 | 1.97 | 0.60 | 1.97 | 0.60 | 1.97 |
| ADHESION STATE | WHEN SAMPLE 1 WAS LIFTED, SAMPLE 2 STUCK TO SAMPLE 1, AND SAMPLE 3 ALSO STUCK TO SAMPLE 2. | WHEN SAMPLE 1 WAS LIFTED, SAMPLE 2 STUCK TO SAMPLE 1, AND SAMPLE 3 ALSO STUCK TO SAMPLE 2. | WHEN SAMPLE 1 WAS LIFTED, SAMPLE 2 DID NOT STICK TO SAMPLE 1. THEREAFTER, WHEN SAMPLE 2 WAS LIFTED, SAMPLE 3 DID NOT STICK TO SAMPLE 2. | WHEN SAMPLE 1 WAS LIFTED, SAMPLE 2 DID NOT STICK TO SAMPLE 1. THEREAFTER, WHEN SAMPLE 2 WAS LIFTED, SAMPLE 3 DID NOT STICK TO SAMPLE 2. | WHEN SAMPLE 1 WAS LIFTED, SAMPLE 2 DID NOT STICK TO SAMPLE 1. THEREAFTER, WHEN SAMPLE 2 WAS LIFTED, SAMPLE 3 DID NOT STICK TO SAMPLE 2. | WHEN SAMPLE 1 WAS LIFTED, SAMPLE 2 DID NOT STICK TO SAMPLE 1. THEREAFTER, WHEN SAMPLE 2 WAS LIFTED, SAMPLE 3 DID NOT STICK TO SAMPLE 2. | WHEN SAMPLE 1 WAS LIFTED, SAMPLE 2 STUCK TO SAMPLE 1, AND SAMPLE 3 ALSO STUCK TO SAMPLE 2. | WHEN SAMPLE 1 WAS LIFTED, SAMPLE 2 DID NOT OFTEN STICK TO SAMPLE 1, BUT SAMPLE 3 STUCK TO SAMPLE 2. |

SEALING DEVICE

CROSS REFERENCE TO RELATED APPLICATIONS

This application is a U.S. National Phase application of International Application No. PCT/JP2019/014771, filed on Apr. 3, 2019 and published in Japanese as WO2019/194219 A1 on Oct. 10, 2019 and claims priority to Japanese Patent Application No. 2018-072536, filed on Apr. 4, 2018. The entire disclosures of the above applications are expressly incorporated by reference herein.

BACKGROUND

Technical Field and Related Art

Rolling bearings, such as ball bearings, are well known and are used, for example, in hubs of automotive vehicles. A sealing device for sealing the inside of a rolling bearing is disclosed in JP-A-2008-281013. The sealing device includes an annular body fixed to the outer race of the rolling bearing, a radial lip extending radially inward from the annular body, and three side lips extending laterally from the annular body. The radial lip is in contact with the outer peripheral surface of the inner race of the bearing or the outer peripheral surface of a part fixed to the inner race, and has a function of sealing lubricant inside the bearing, whereas the three side lips are in contact with a flange of the inner race, and have a function of sealing, so that foreign matter, such as water and dust, does not enter into the inside of the bearing from the outside.

Multiple sealing devices disclosed in JP-A-2008-281013 are designed to be stacked when they are transported.

SUMMARY

Many sealing devices may be stacked in the manufacturing process, transport process, or deployment process. In this case, it is desirable that a sealing device above not adhere (stick) to the sealing device below it.

Accordingly, the present invention provides a sealing device in which an upper sealing device is less likely to adhere to the sealing device immediately below when multiple sealing devices are stacked.

A sealing device according to an aspect of the present invention is a sealing device located between an inner member and an outer member that rotate relative to each other, for sealing a gap between the inner member and the outer member, the sealing device comprising: a tubular part having a central axis and for being mounted on a cylindrical end portion of the outer member; an annular part connected to an end of the tubular part and having a portion located radially inside the end portion of the outer member; and at least one lip extending from the annular part toward the inner member, each of the annular part and the tubular part comprising an elastic part made of an elastic material and a rigid part made of a rigid material, at least one of an upper surface of the annular part that is opposite to the tubular part and a lower surface of the tubular part that is opposite to the annular part being formed of the elastic part, multiple protrusions being formed on at least one of the upper surface of the annular part and the lower surface of the tubular part, the protrusions protruding along an axial direction of the sealing device, the multiple protrusions being arranged on a circle centered on the central axis and spaced apart from each other.

In this aspect, when a plurality of sealing devices of the same type are stacked, the lower surface of the tubular part of an upper sealing device is placed on the upper surface of the annular part of the sealing device immediately below. At least one of the upper surface of the annular part and the lower surface of the tubular part is formed of an elastic material that easily adheres to other objects. However, multiple protrusions, which protrude along an axial direction of the sealing device and are spaced apart from each other, are formed on at least one of the upper surface of the annular part and the lower surface of the tubular part. Accordingly, a plurality of protrusions spaced apart from each other are interposed between the lower surface of the tubular part of the upper sealing device and the upper surface of the annular part of the sealing device immediately below, so that the total contact area of the upper sealing device and sealing device immediately below is small. For this reason, it is difficult for the upper sealing device to adhere to the sealing device immediately below, and each sealing device can be easily separated from other sealing devices.

BRIEF DESCRIPTION OF THE DRAWINGS

FIG. 32 is a table showing results of experiments for examining a suitable area range of the protrusions of the sealing device.

DETAILED DESCRIPTION

Hereinafter, with reference to the accompanying drawings, multiple embodiments according to the present invention will be described. It is noted that the drawings do not necessarily accurately show relative dimensional ratios of actual products according to the embodiments and certain dimensions may be exaggerated.

First Embodiment

Figure 1:
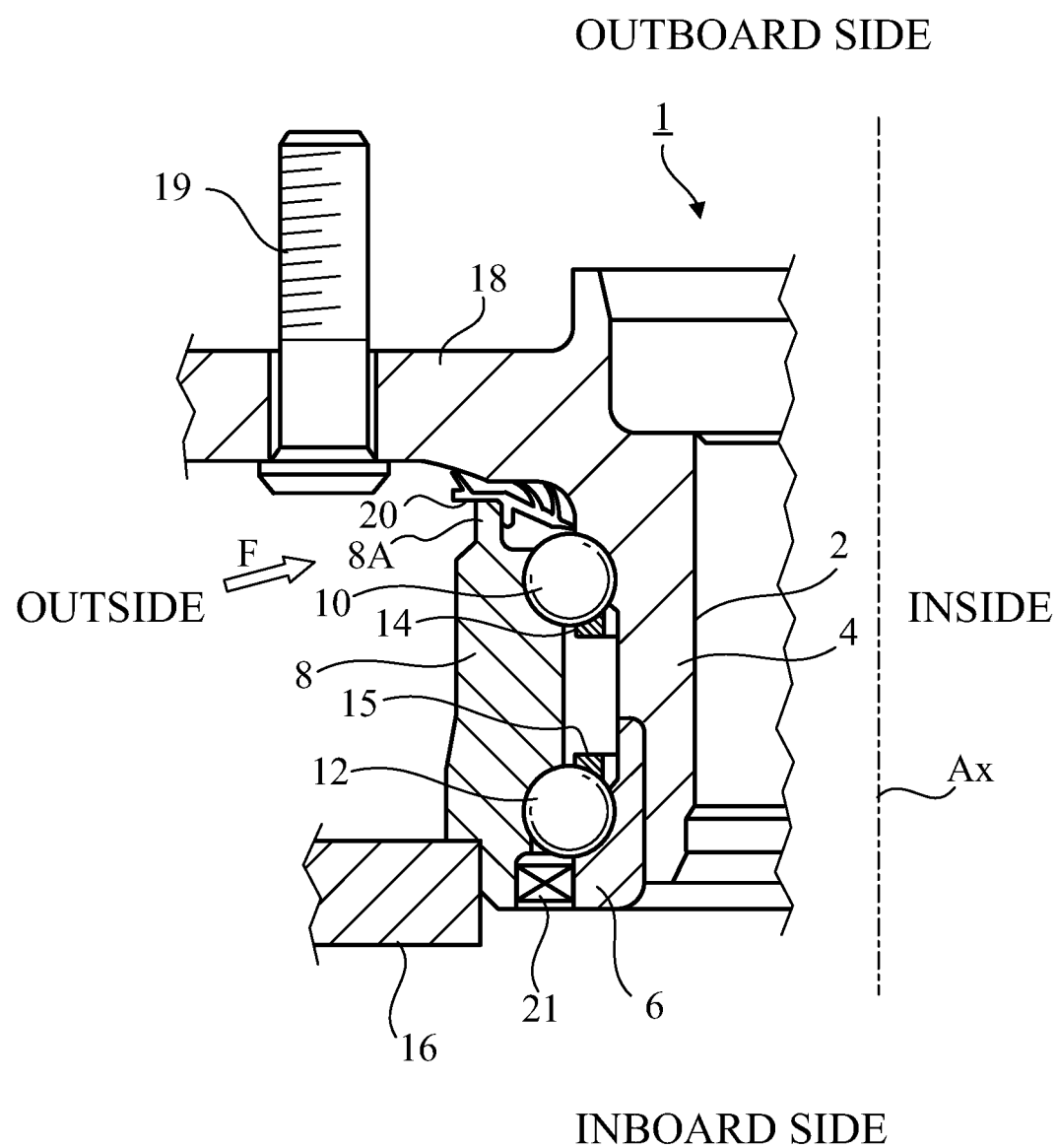
FIG. 1 is a partial cross-sectional view of an example of a rolling bearing in which a sealing device according to any one of embodiments of the present invention is used.

FIG. 1 shows a hub bearing for an automotive vehicle, which is an example of a rolling bearing, in which a sealing device according to any one of embodiments of the present invention is used. However, the use of the present invention is not limited to hub bearings, and the present invention can also be applied to other rolling bearings. In the following description, the hub bearing is a ball bearing. However, the use of the present invention is not limited to ball bearings, and the present invention can also be applied to other rolling bearings, such as roller bearings and needle bearings, having other types of rolling elements. The present invention is also applicable to rolling bearings used in machines other than automotive vehicles.

The hub bearing 1 includes a hub (inner member) 4 having a hole 2 into which a spindle (not shown) is inserted, an inner race (inner member) 6 attached to the hub 4, an outer race (outer member) 8 located outside of the hub 4 and the inner race 6, multiple balls 10 arranged in a row between the hub 4 and the outer race 8, multiple balls 12 arranged in a row between the inner race 6 and the outer race 8, and multiple retainers 14 and 15 for retaining the balls in place.

Whereas the outer race 8 is stationary, the hub 4 and the inner race 6 rotate as the spindle rotates.

The common central axis Ax of the spindle and hub bearing 1 extends in the vertical direction in FIG. 1. In FIG. 1, only the left part with respect to the central axis Ax is shown. Although not shown in detail, the upper side of FIG. 1 is the outer side (outboard side) of the automotive vehicle where the wheels are arranged, whereas the lower side is the inner side (inboard side) where the differential gears are arranged. The outer side and the inner side shown in FIG. 1 mean the outer side and the inner side in radial directions, respectively.

The outer race 8 of the hub bearing 1 is fixed to the hub knuckle 16. The hub 4 has an outboard side flange 18 extending further outward in radial directions than the outer race 8. A wheel can be attached to the outboard side flange 18 by hub bolts 19.

A sealing device 20 that seals the gap between the outer race 8 and the hub 4 is located near the end of the outer race 8 on the outboard side, and inside the end of the outer race 8 on the inboard side. Another sealing device 21 that seals the gap between the outer race 8 and the inner race 6 is located inside the end of the inner side of the outer race 8. The function of the sealing devices 20 and 21 prevents the grease, that is, the lubricant, from flowing out from the inside of the hub bearing 1 and prevents foreign matter such as water (including muddy water or salt water) from entering the inside of the hub bearing 1 from the outside. In FIG. 1, an arrow F indicates an example of the direction of foreign matter flow from the outside.

Figure 2:
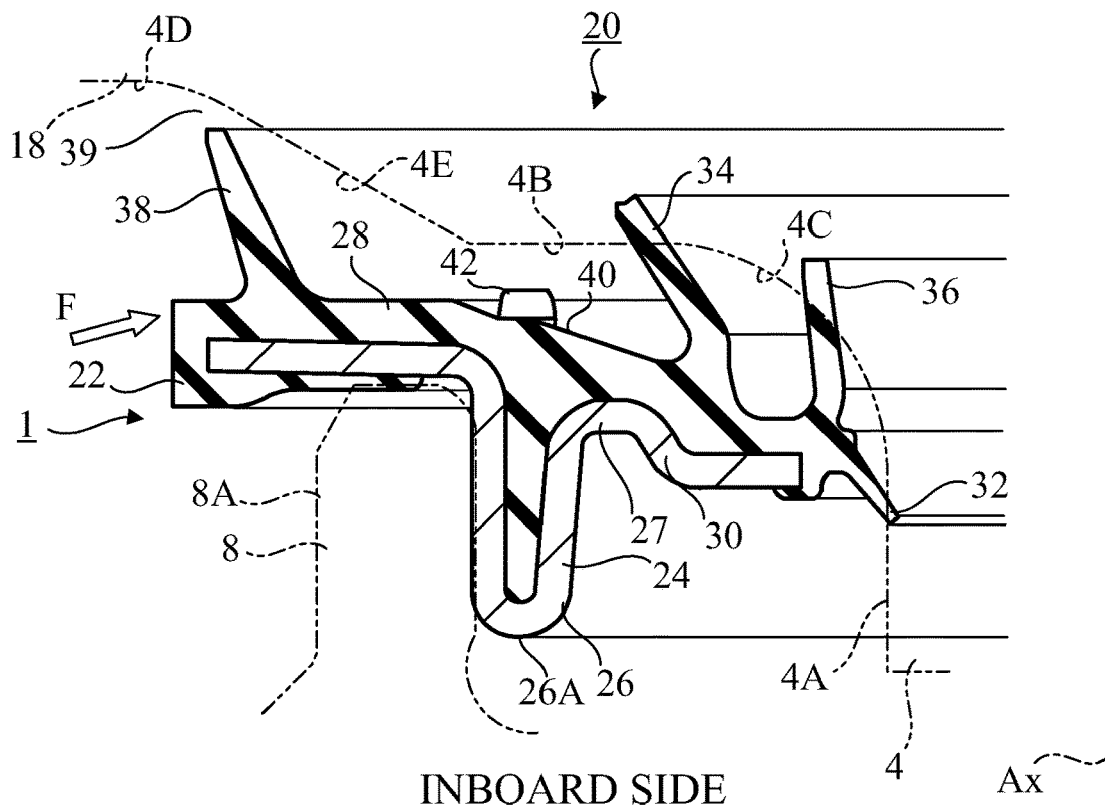
FIG. 2 is a partial cross-sectional view of a sealing device according to a first embodiment of the present invention.

The sealing device 20 is located between the rotating hub 4 of the hub bearing 1 and the stationary outer race 8 to seal the gap between the hub 4 and the outer race 8. As shown in FIG. 2, most of the sealing device 20 is located inside a space surrounded by a cylindrical end portion 8A on the outboard side of the outer race 8 of the hub bearing 1, the outer peripheral surface 4A of a part, in the vicinity of the balls 10, of the hub 4 of the hub bearing 1, a flange surface 4B of the hub 4 expanding further outward than the outer peripheral surface 4A, and an arc surface 4C connecting the outer peripheral surface 4A and the flange surface 4B. The flange surface 4B is a surface on the inboard side of the outboard side flange 18. Although the sealing device 20 is annular, only the left part is shown in FIG. 2.

In FIG. 2, the hub 4 and the outer race 8 are indicated by phantom lines. Although portions of the sealing device 20 that are in contact with the hub 4 and the outer race 8 deform by the contact, FIG. 2 shows the outline of the sealing device 20 when it is not in use.

Figure 3:
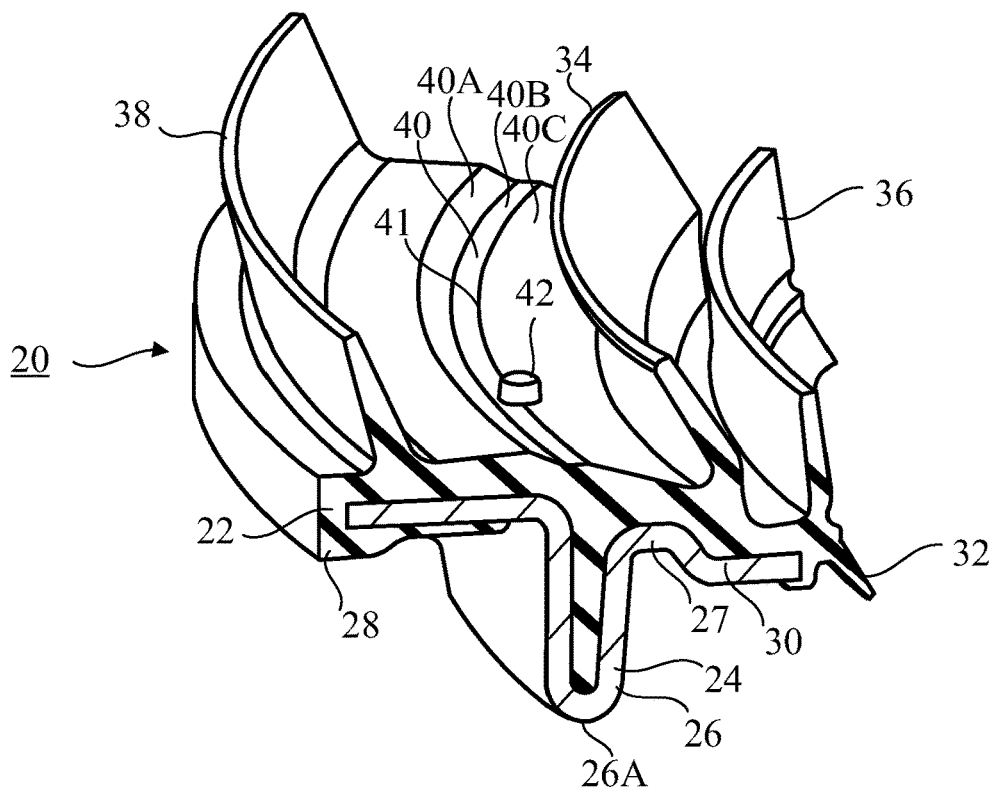
FIG. 3 is a perspective view of the sealing device according to the first embodiment in which a part is cutaway.

As shown in FIGS. 2 and 3, the sealing device 20 includes an elastic ring 22 formed of an elastic material, for example, an elastomer, and a reinforcing ring 24 formed of a rigid material, for example, a metal that reinforces the elastic ring 22. A part of the reinforcing ring 24 is embedded in the elastic ring 22, and is in close contact with the elastic ring 22.

The sealing device 20 includes a tubular part 26, an annular part 27, a radial lip 32, two side lips 34 and 36, and an auxiliary lip 38. The annular part 27 has an outer annular part 28 and an inner annular part 30.

The tubular part 26 is a cylindrical part centered on the central axis Ax (see FIGS. 1 and 2), and is fitted into the cylindrical end portion 8A of the outer race 8. The tubular part 26 is fixed to the end portion 8A. The fixing scheme is not limited, and it may be, for example, an interference fit. That is, the tubular part 26 may be press-fitted into the end portion 8A. The tubular part 26 is constituted of tubular portions in which the reinforcing ring 24 is folded and an elastic ring 22 filled in these tubular portions. The outer tubular portion of the tubular portions in which the reinforcing ring 24 is folded has the outer peripheral surface of the tubular part 26, and it is in close contact with the inner peripheral surface of the end portion 8A by the interference fit. The lower surface 26A (surface opposite to the annular part 27) of the tubular part 26 is formed by the bent portion of the reinforcing ring 24.

The outer annular part 28 extends radially outward from the tubular part 26 and is substantially orthogonal to the central axis Ax of the hub bearing 1. The outer annular part 28 is also constituted of the elastic ring 22 and the reinforcing ring 24, and the reinforcing ring 24 is embedded in the elastic ring 22. In the outer annular part 28, the elastic ring 22 faces, and is in contact with, the end surface of the end portion 8A of the outer race 8.

The inner annular part 30 extends radially inward from the tubular part 26 and is located radially inward of the end portion 8A of the outer race 8. In this embodiment, the inner annular part 30 extends obliquely from the outer annular part 28 radially inward and toward the inboard side. The inner annular part 30 is also constituted of the elastic ring 22 and the reinforcing ring 24.

The outer annular part 28 and the inner annular part 30 are continuous and constitute an annular part 27 connected to the upper end of the tubular part 26. Here, a portion outside the inner peripheral surface of the end portion 8A of the outer race 8 is called the outer annular part 28, and a portion inside the inner peripheral surface of the end portion 8A is called the inner annular part 30.

The radial lip 32 and the side lips 34 and 36 are made of only an elastic material, and are thin plate rings extending from a portion of the inner annular part 30 corresponding to the elastic ring 22, and their respective distal ends are in contact with the hub 4. Whereas the sealing device 20 is mounted on the stationary outer race 8, the hub 4 rotates, so that the lips 32, 34, and 36 slide on the hub 4.

The radial lip 32 extends from the innermost edge of the inner annular part 30 and is in contact with the outer peripheral surface 4A of the hub 4 in the vicinity of the balls 10. The radial lip 32 extends radially inward and toward the inboard side, and plays a main role of preventing the lubricant from flowing out from the hub bearing 1.

The side lips 34 and 36 extend from a portion of the inner annular part 30 corresponding to the elastic ring 22 laterally (to the outboard side) and radially outward. The side lip 34 is contact with the flange surface 4B of the hub 4, whereas the side lip 36 is contact with the arc surface 4C. The side lips 34 and 36 play a main role of preventing foreign matter from flowing into the hub bearing 1 from the outside. The side lip 36 has a backup function that blocks foreign matter that has flowed through the side lip 34. Since the side lip 36 exists between the radial lip 32 and the side lip 34, it can also be called an intermediate lip.

FIG. 2 shows the radial lip 32 and the side lips 34 and 36 when the sealing device 20 is not deployed in the hub bearing 1. At this time, the radial lip 32 and the side lips 34 and 36 are not subjected to external force and are in a straight state. However, when the sealing device 20 is deployed in the hub bearing 1, these lips are in contact with the hub 4 and are deformed by receiving reaction forces.

The auxiliary lip 38 is made of only an elastic material, and it is a thin plate ring extending from the outer annular part 28. The auxiliary lip 38 is located radially outside the tubular part 26 and extends in the direction opposite to the tubular part 26 (toward the outboard side). The auxiliary lip 38 extends toward the flange surface 4D of the outboard side flange 18 of the hub 4. The flange surface 4D is a surface recessed than the flange surface 4B. The flange surfaces 4B and 4D are connected by an inclined surface 4E. The auxiliary lip 38 deflects foreign matter coining from the outside and can minimize foreign matter reaching the side lips 34.

In this embodiment, the auxiliary lip 38 is not in contact with the flange surface 4D of the outboard side flange 18, so that an annular and labyrinth-shaped clearance 39 is provided between the distal end edge of the auxiliary lip 38 and the flange surface 4D. However, the auxiliary lip 38 may be in contact with, and slide on, the flange surface 4D. The auxiliary lip 38 is not absolutely necessary.

The upper surface 40 (surface opposite to the tubular part 26) of the inner annular part 30 is formed of the elastic ring 22. On the upper surface 40 of the inner annular part 30, multiple protrusions 42 are formed of the same elastic material as that of the elastic ring 22. The protrusions 42 are spaced apart from one another and are arranged on a circle centered on the central axis Ax of the hub bearing 1 and the tubular part 26, and protrude upward along the direction of the central axis Ax. "Protrude along the direction of the central axis Ax" means to include not only that the protruding direction of each protrusion 42 (for example, the direction of the axis of each protrusion 42 itself) is parallel to the central axis Ax as shown in FIG. 2, but to also include that the protruding direction of each protrusion 42 is inclined with respect to the central axis Ax. The protrusions 42 are not in contact with the hub 4 or the outer race 8, and do not have a sealing function or a function of protecting from foreign matter in contrast to lips.

Figure 4:
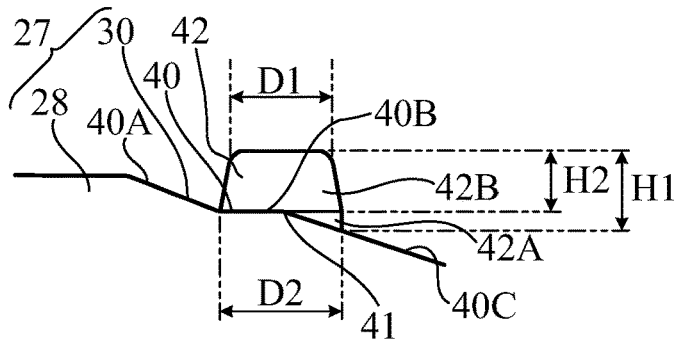
FIG. 4 is a side view showing a protrusion of the sealing device according to the first embodiment.

As shown in FIGS. 3 and 4, the upper surface 40 of the inner annular part 30 includes an inclined surface 40A, a flat surface 40B, and an inclined surface 40C. The inclined surface 40A is connected to the upper surface of the outer annular part 28, which is substantially orthogonal to the central axis Ax, and is inclined so as to descend radially inward. The flat surface 40B is continuous with the inclined surface 40A and is a plane orthogonal to the central axis Ax. The inclined surface 40C is continuous with the flat surface 40B, and is inclined so as to descend radially inward. Each protrusion 42 is located on a circle 41 that is the boundary between the flat surface 40B and the inclined surface 40C.

As shown in FIG. 4, each protrusion 42 has an outline that narrows toward the distal end. In other words, in each protrusion 42, the sectional area on the distal end side (the area of the section perpendicular to the height direction of the protrusion 42) is less than the sectional area on the proximal end side. Specifically, each protrusion 42 has two portions 42A and 42B. The portion 42A has a shape of a part of a cylinder having an axis parallel to the central axis Ax, and protrudes upward from the inclined surface 40C. The portion 42B has a substantially truncated cone shape having the same axis as the cylinder of the portion 42A, and protrudes upward from the portion 42A and the flat surface 40B. The truncated cone shape portion 42B has a tapered shape having a larger diameter toward the proximal end, i.e., the lower end. For example, the diameter D1 of the distal end surface, i.e., the upper end surface of the portion 42B is less than the diameter D2 of the proximal end, i.e., the lower end of the portion 42B (that is twice the radius of curvature of the portion 42A).

The height H2 of the portion 42B of each protrusion 42 is less than the minimum diameter D1 of the portion 42B. Furthermore, the protruding amount, that is, the height H1 of each protrusion 42, is equal to or less than the minimum diameter D1 of the portion 42B. The multiple protrusions 42 have the same size and the same shape, and the distal end surfaces of the multiple protrusions 42 are flush with one another.

Figure 5:
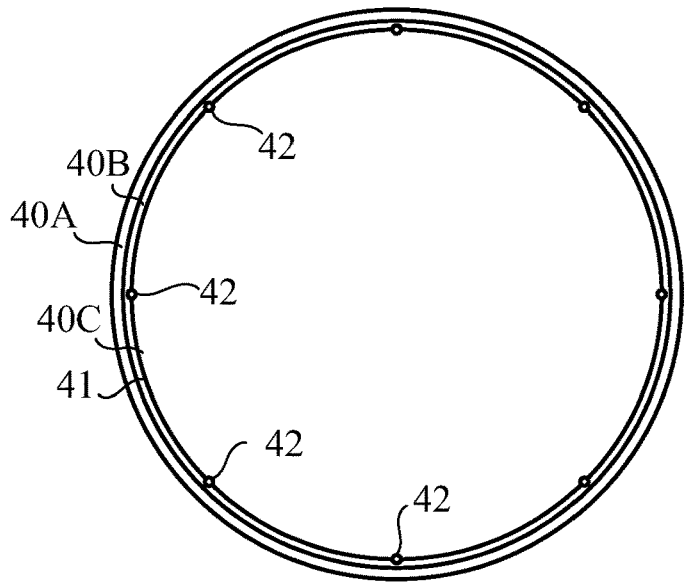
FIG. 5 is a schematic plan view showing an example of arrangement of protrusions in the sealing device according to the first embodiment.

As shown in FIG. 5, the multiple protrusions 42 may be arranged at equiangular intervals. FIG. 5 shows eight protrusions 42, which are arranged at angular intervals of 45 degrees. However, the number and angular intervals of the protrusions 42 are not limited to the example of FIG. 5. In order to stably support the upper sealing device 20, the number of the protrusions 42 is preferably at least three.

Figure 6:
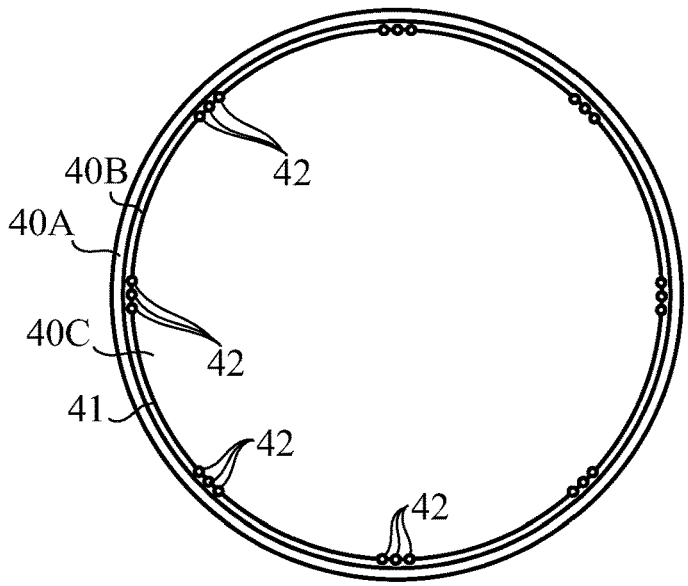
FIG. 6 is a schematic plan view showing another example of arrangement of protrusions in the sealing device according to the first embodiment.

As shown in FIG. 6, the multiple protrusions 42 may be arranged at unequal angular intervals. FIG. 6 shows 24 protrusions 42. These protrusions 42 can be classified into eight groups, each group consisting of three neighboring protrusions 42. These groups are arranged at angular intervals of 45 degrees. However, the number of groups and the number of protrusions 42 are not limited to the example of FIG. 6.

Figure 7:
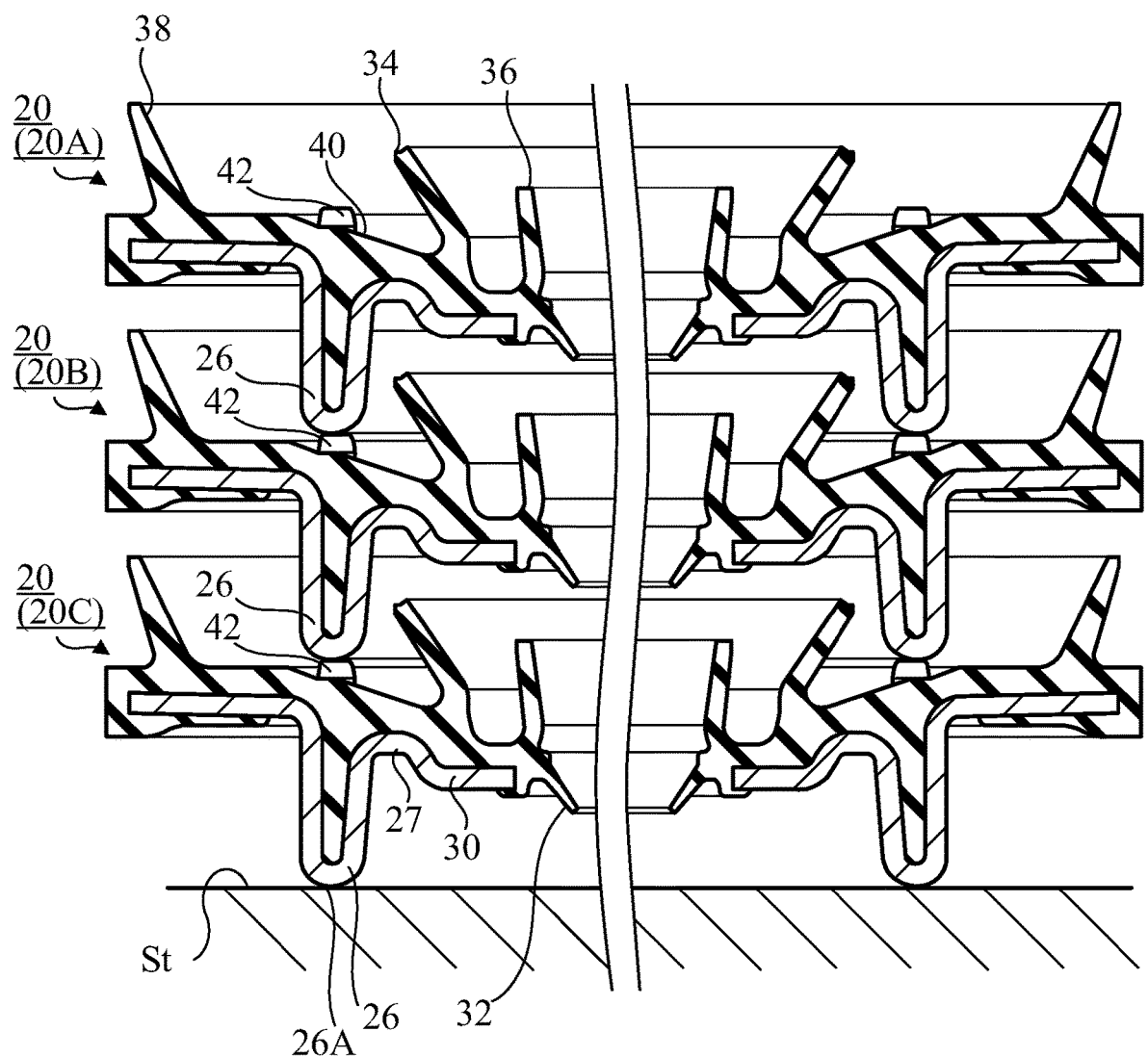
FIG. 7 is a cross-sectional view of sealing devices according to the first embodiment when stacked.

FIG. 7 shows a state in which multiple sealing devices 20 of the same type are stacked on a stage St. When a large number of sealing devices 20 are stacked in the manufacturing process, transport process, or deployment process, it is desirable that each sealing devices 20 can be easily separated from other sealing devices 20. In this embodiment, when multiple sealing devices 20 of the same type are stacked, the lower surface 26A of the tubular part 26 of the upper sealing device 20 is placed on the upper surface 40 of the annular part 27 of the sealing device 20 immediately below. The upper surface 40 of the annular part 27 is formed of an elastic material that easily adheres to other objects. However, on the upper surface 40 of the annular part 27, multiple protrusions 42, which protrude along the direction of the central axis Ax, are formed and are spaced apart from one another. The diameter of the circle on which the outer ends of the multiple protrusions 42 in radial directions of the sealing device 20 are located is greater than the diameter of the lower surface 26A of the tubular part 26. The diameter of the circle on which the inner ends of the multiple protrusions 42 in radial directions of the sealing device 20 are located is less than the diameter of the lower surface 26A of the tubular part 26. Accordingly, the multiple protrusions 42 spaced apart from one another are interposed between the lower surface 26A of the tubular part 26 of the upper sealing device 20 and the upper surface 40 of the annular part 27 of the sealing device 20 immediately below, so that the total contact area of the tubular part 26 of the upper sealing device 20 and the sealing device 20 immediately below is small. For this reason, it is difficult for the upper sealing device 20 to adhere to the sealing device 20 immediately below, and each sealing device 20 can be easily separated from other sealing devices 20.

The length, orientation, and position of each of the lips 32, 34, 36, and 38 are designed so that the lips 32, 34, 36, and 38 are not in contact with other sealing devices 20 when the sealing devices 20 are stacked. In short, it is considered that when multiple sealing devices 20 are stacked, the lower surface 26A of the tubular part 26 of a sealing device 20 is brought into contact with the protrusions 42 formed on the upper surface 40 of the inner annular part 30 of another sealing device 20, but other portions are not in contact with one another.

When the sealing devices 20 are stacked, the protrusions 42 of the lower sealing device 20 are compressed and deformed under the load of the upper sealing devices 20. The initial height H1 of the protrusions 42 is designed so that portions other than the protrusions 42, for example, the upper surface 40 of the inner annular part 30, are not in contact with the upper sealing device 20, even though the protrusions 42 are compressed and deformed.

In this embodiment, the lower surface 26A of the tubular part 26 is formed of the reinforcing ring 24 made of a rigid material. Therefore, when multiple sealing devices 20 are stacked, the protrusions 42 formed of an elastic material, for example, an elastomer, are unlikely to adhere to the lower surface 26A of the tubular part 26, so that each sealing device 20 can be more easily separated from other sealing devices 20.

As described above, each protrusion 42 includes a portion 42A having a shape of a part of a cylinder and a truncated cone portion 42B. Accordingly, the length (diameter D1) of the distal end of each protrusion 42 in a radial direction of the sealing device 20 is equal to the length (diameter D1) of the distal end of each protrusion 42 in the circumferential direction on the circle 41. Since the length of the distal end of each protrusion 42 in a radial direction of the sealing device 20 is thus large, when multiple sealing devices 20 are stacked, the upper sealing device 20 is securely brought into contact with the distal ends of the respective protrusions 42 of the sealing device 20 immediately below and is stably supported, even if the sealing devices 20 are eccentric or protrusions 42 have position errors. Furthermore, since the length of the distal end of each protrusion 42 in a radial direction of the sealing device 20 is large relative to the length on the circle 41, each protrusion 42 has a high level of strength against forces in radial directions of the sealing device 20.

The diameter D1 of the distal end of each protrusion 42 (the length of the distal end in a radial direction of the sealing device 20 and the length of the distal end on the circle 41) is greater than the height H2 of the portion 42B of each protrusion 42, and is equal to or greater than the protruding amount of the each protrusion 42 in the axial direction, i.e., the height H1. Since the lengths in a radial direction and on the circle 41 of the distal end of each protrusion 42 are thus large, the amount of compressive deformation of the protrusions 42 is suppressed when the load of the upper sealing devices 20 is received, so that it is possible to reduce or prevent the lower surface 26A of the tubular part 26 of the upper sealing device 20 from being in surface contact with the upper surface 40 of the annular part 27 of the sealing device 20 immediately below. In addition, since the radial length of the distal end of each protrusion 42 is large relative to the protruding amount in the axial direction, each protrusion 42 is unlikely to collapse or buckle.

The diameter D1 of the distal end of each protrusion 42 (the lengths of the distal end in the radial direction of the sealing device 20 and on the circle 41) is less than the diameter D2 of the proximal end of each protrusion 42 (the lengths of the proximal end in the radial direction of the sealing device 20 and on the circle 41). Therefore, each protrusion 42 is unlikely to collapse or buckle.

Figure 8:
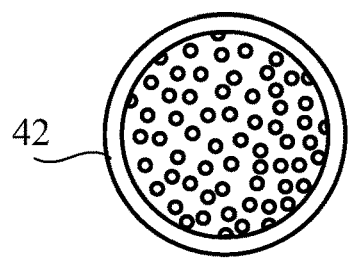
FIG. 8 is an enlarged plan view showing a protrusion of a sealing device according to the first embodiment.

FIG. 8 is an enlarged plan view showing the protrusion 42. As shown in FIG. 8, it is preferable that a large number of minute convexities and concavities be irregularly formed on the distal end surface of each protrusion 42 with matte finish. Such minute unevenness reduces the contact area between the protrusion 42 and the lower surface 26A of the tubular part 26, and thus, the protrusion 42 is unlikely to adhere to the lower surface 26A of the tubular part 26. Therefore, each sealing device 20 can be more easily separated from other sealing devices 20. When making matte finish, the treatment may be performed only on the distal end surfaces of the protrusions 42, on the entirety of protrusions 42, or on the entire upper surface 40 of the inner annular part 30.

Figure 9:
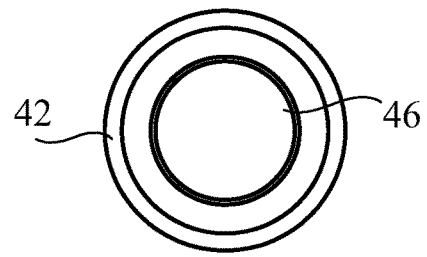
FIG. 9 is an enlarged plan view showing another example of the protrusion.
Figure 10:
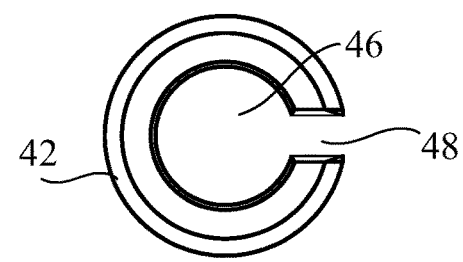
FIG. 10 is an enlarged plan view showing another example of the protrusion.

FIGS. 9 to 13 show other examples of the protrusion 42 in an enlarged manner. As shown in FIG. 9, a recess 46 may be formed on the distal end surface of the protrusion 42 to reduce the contact area between the protrusion 42 and the lower surface 26A of the tubular part 26. Moreover, as shown in FIG. 10, a groove 48 through which the recess 46 communicates with the outside may be formed in the protrusion 42, so that the distal end surface of the protrusion 42 may be more unlikely to adhere to the lower surface 26A of the tubular part 26. In the examples of FIGS. 9 and 10, the matte finish may also be made on the distal end surface of the protrusion 42.

Figure 11:
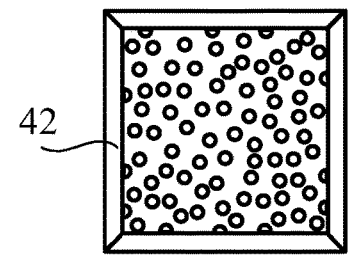
FIG. 11 is an enlarged plan view showing another example of the protrusion.
Figure 12:
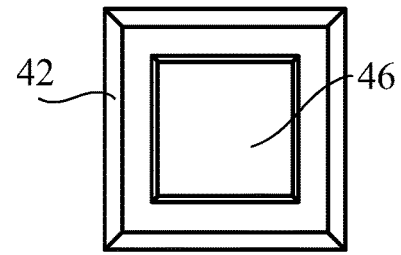
FIG. 12 is an enlarged plan view showing another example of the protrusion.
Figure 13:
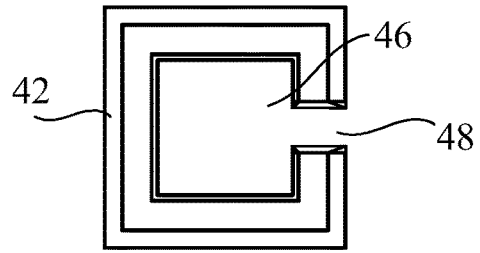
FIG. 13 is an enlarged plan view showing another example of the protrusion.

The protrusion 42 has a substantially truncated cone shape. However, as shown in FIGS. 11 to 13, the protrusion 42 may have a substantially truncated pyramid shape. As shown in FIG. 11, it is preferable that a large number of minute convexities and concavities be irregularly formed on the distal end surface of each protrusion 42 with matte finish. As shown in FIG. 12, a recess 46 may be formed on the distal end surface of the protrusion 42 to reduce the contact area between the protrusion 42 and the lower surface 26A of the tubular part 26. Moreover, as shown in FIG. 13, a groove 48 through which the recess 46 communicates with the outside may be formed in the protrusion 42, so that the distal end surface of the protrusion 42 may be more unlikely to adhere to the lower surface 26A of the tubular part 26. In the examples of FIGS. 12 and 13, matte finish may also be made on the distal end surface of the protrusion 42. The protrusion 42 may have another shape.

Second Embodiment

Figure 14:
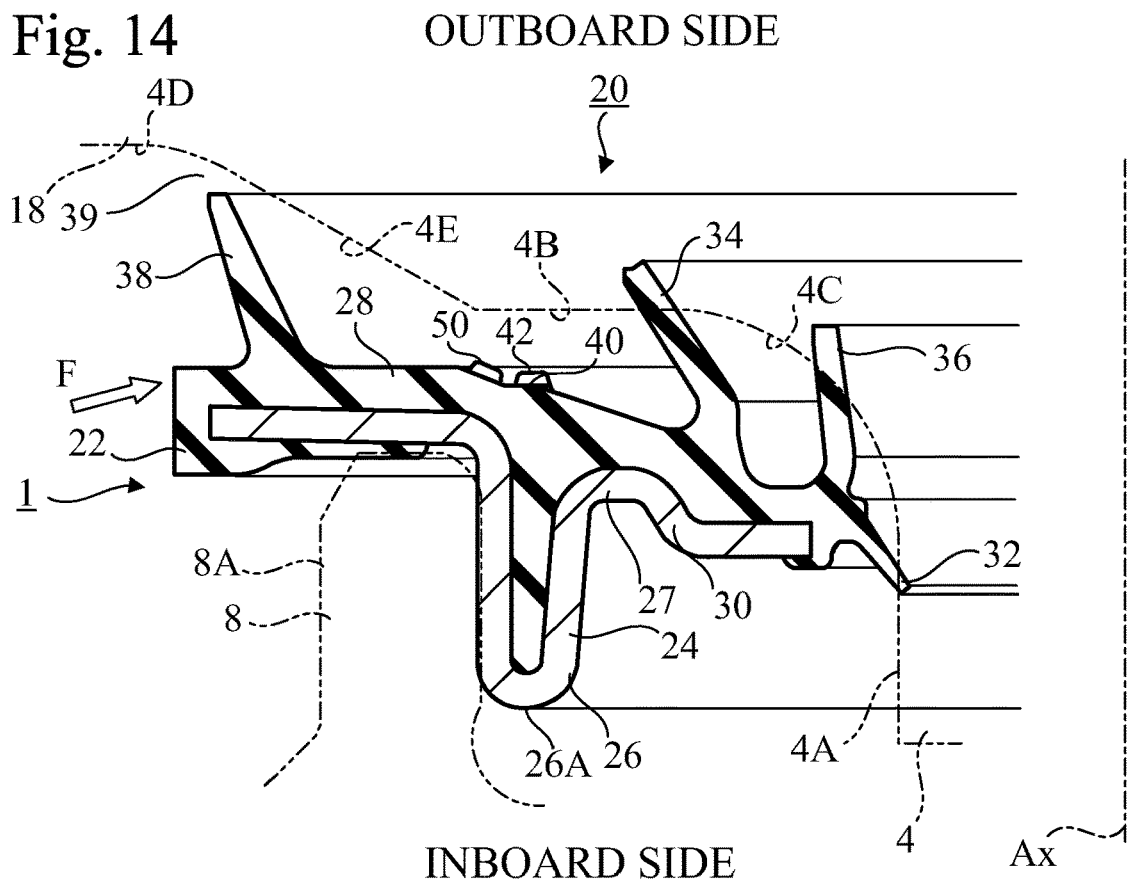
FIG. 14 is a partial cross-sectional view of a sealing device according to a second embodiment of the present invention.
Figure 15:
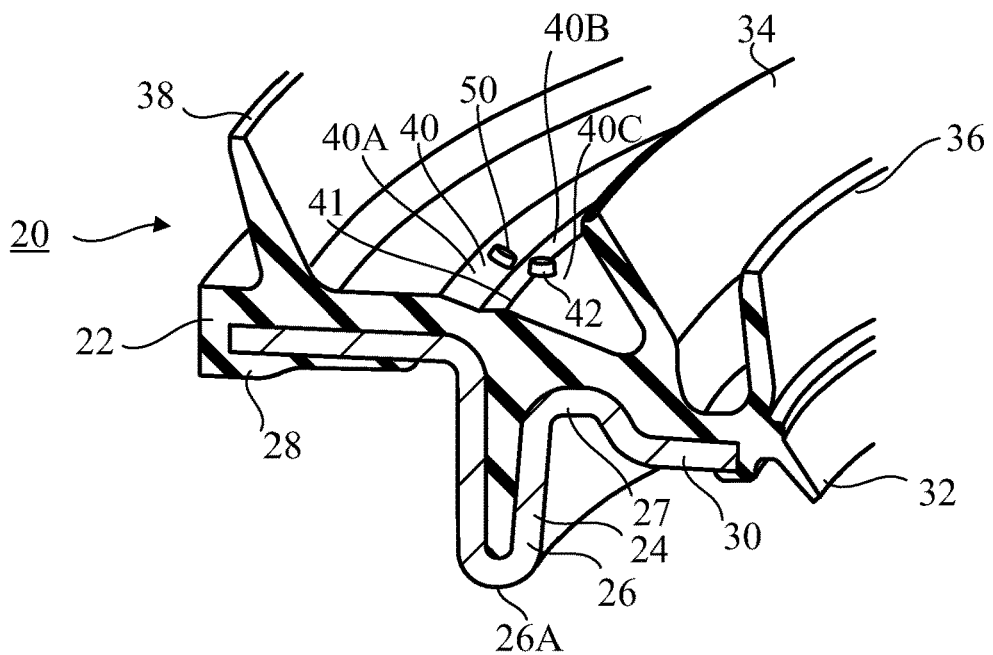
FIG. 15 is a perspective view of the sealing device according to the second embodiment in which a part is cutaway.

FIGS. 14 to 19 show a second embodiment of the present invention. In FIG. 14 and the subsequent drawings, the same reference symbols are used for identifying components that are the same as those in the first embodiment, and such components will not be described in detail.

In this embodiment, multiple second protrusions 50 are provided on the upper surface 40 of the inner annular part 30 in addition to the multiple protrusions 42. Each second protrusion 50 is made of the same elastic material as that of the elastic ring 22. The multiple second protrusions 50 are spaced apart from one another and are arranged on a circle centered on the central axis Ax and protrude upward along the direction of the central axis Ax. "Protrude along the direction of the central axis Ax" means to include that the protruding direction of each second protrusion 50 is inclined with respect to the central axis Ax as illustrated.

The circle on which the multiple second protrusions 50 are arranged is radially outside the circle 41 on which the multiple protrusions 42 are arranged. Specifically, whereas the protrusions 42 are located on the circle 41 that is the boundary between the flat surface 40B and the inclined surface 40C of the upper surface 40, the second protrusions 50 are located on the inclined surface 40A outside the flat surface 40B. The second protrusions 50 are not in contact with the hub 4 or the outer race 8, and do not have a sealing function or a function of protecting from foreign matter, in contrast to lips.

Figure 16:
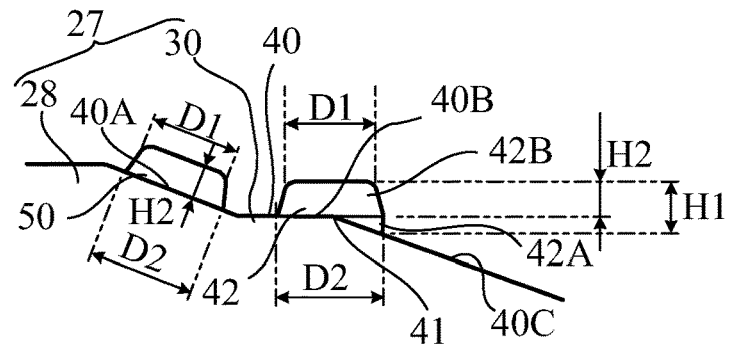
FIG. 16 is a side view showing a protrusion and a second protrusion of the sealing device according to the second embodiment.

As shown in FIG. 16, each protrusion 42 has a shape similar to each protrusion 42 of the first embodiment. Each protrusion 42 has a portion 42A having a shape of a part of a cylinder and a substantially truncated cone shape portion 42B. The truncated cone shape portion 42B has a tapered shape having a larger diameter toward the proximal end, i.e., the lower end. For example, the diameter D1 of the distal end surface, i.e., the upper end surface of the portion 42B is less than the diameter D2 of the proximal end, i.e., the lower end of the portion 42B (that is twice the radius of curvature of the portion 42A).

The height H2 of the portion 42B of each protrusion 42 is less than the minimum diameter D1 of the portion 42B. Furthermore, the protruding amount, that is, the height H1 of each protrusion 42, is less than the minimum diameter D1 of the portion 42B. The multiple protrusions 42 have the same size and the same shape, and the distal end surfaces of the multiple protrusions 42 are flush with one another.

The second protrusion 50 has a contour that narrows toward the distal end. That is, the second protrusion 50 has the same size and the same shape as those of the portion 42B of the protrusion 42. The second protrusion 50 has a tapered shape having a larger diameter toward the proximal end, i.e., the lower end. For example, the diameter D1 of the distal end surface, i.e., the upper end surface of the second protrusion 50 is less than the diameter D2 of the proximal end, i.e., the lower end of the second protrusion 50. The height H2 of the second protrusion 50 is less than the minimum diameter D1 of the second protrusion 50. The axial direction of the second protrusion 50 is orthogonal to the inclined surface 40A.

Figure 17:
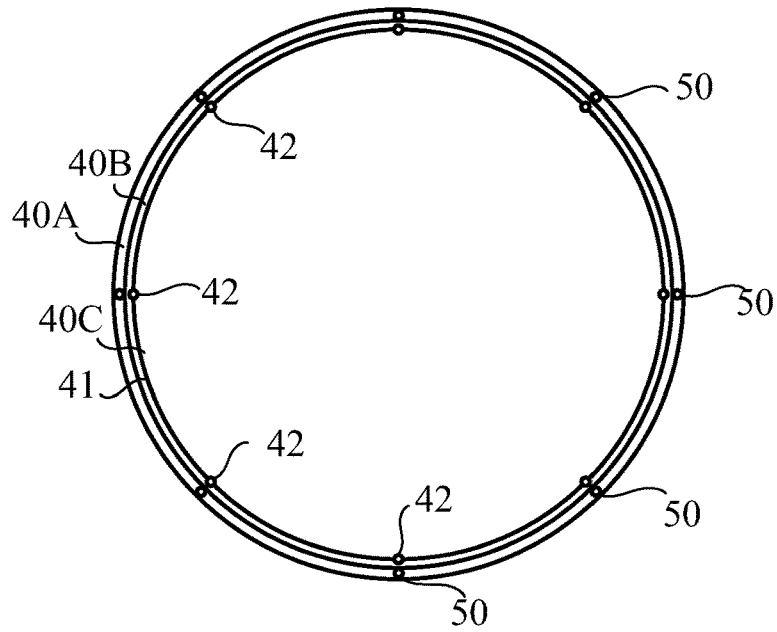
FIG. 17 is a schematic plan view showing an example of arrangement of protrusions and second protrusions in the sealing device according to the second embodiment.

As shown in FIG. 17, the multiple second protrusions 50 may be arranged at equiangular intervals. FIG. 17 shows eight second protrusions 50, which are arranged at angular intervals of 45 degrees. However, the number and angular intervals of the second protrusions 50 are not limited to the example of FIG. 17. In a case in which the second protrusions 50 receive the load of the upper sealing devices 20, the number of the second protrusions 50 is preferably at least three in order to stably support the upper sealing devices 20.

Figure 18:
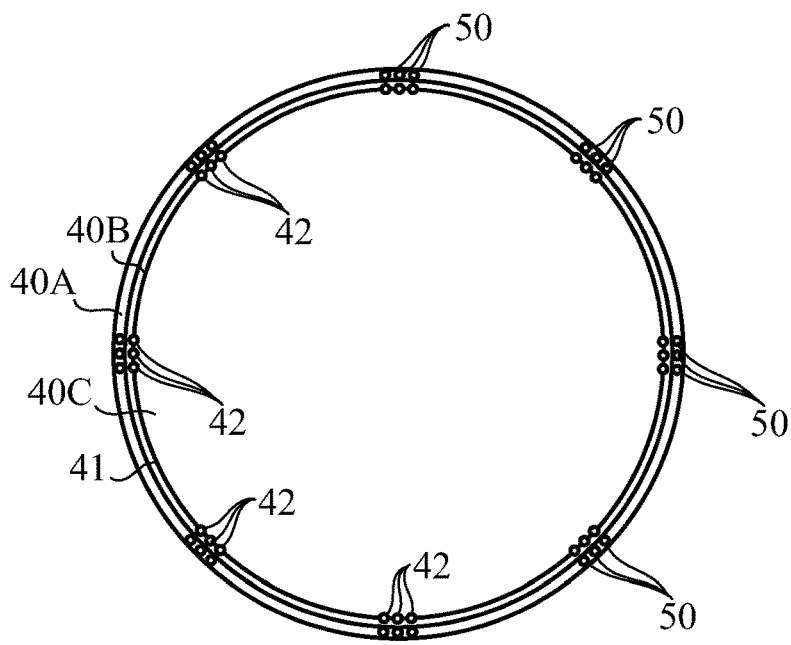
FIG. 18 is a schematic plan view showing another example of arrangement of the protrusions and second protrusions in the sealing device according to the second embodiment.

As shown in FIG. 18, the multiple second protrusions 50 may be arranged at unequal angular intervals. FIG. 18 shows 24 second protrusions 50. These second protrusions 50 can be classified into eight groups, each group consisting of three neighboring second protrusions 50. These groups are arranged at angular intervals of 45 degrees. However, the number of groups and the number of second protrusions 50 are not limited to the example of FIG. 18. In FIGS. 17 and 18, the angular arrangement of the second protrusions 50 is the same as the angular arrangement of the protrusions 42, but the angular arrangement of the second protrusions 50 may be different from the angular arrangement of the protrusions 42.

Figure 19:
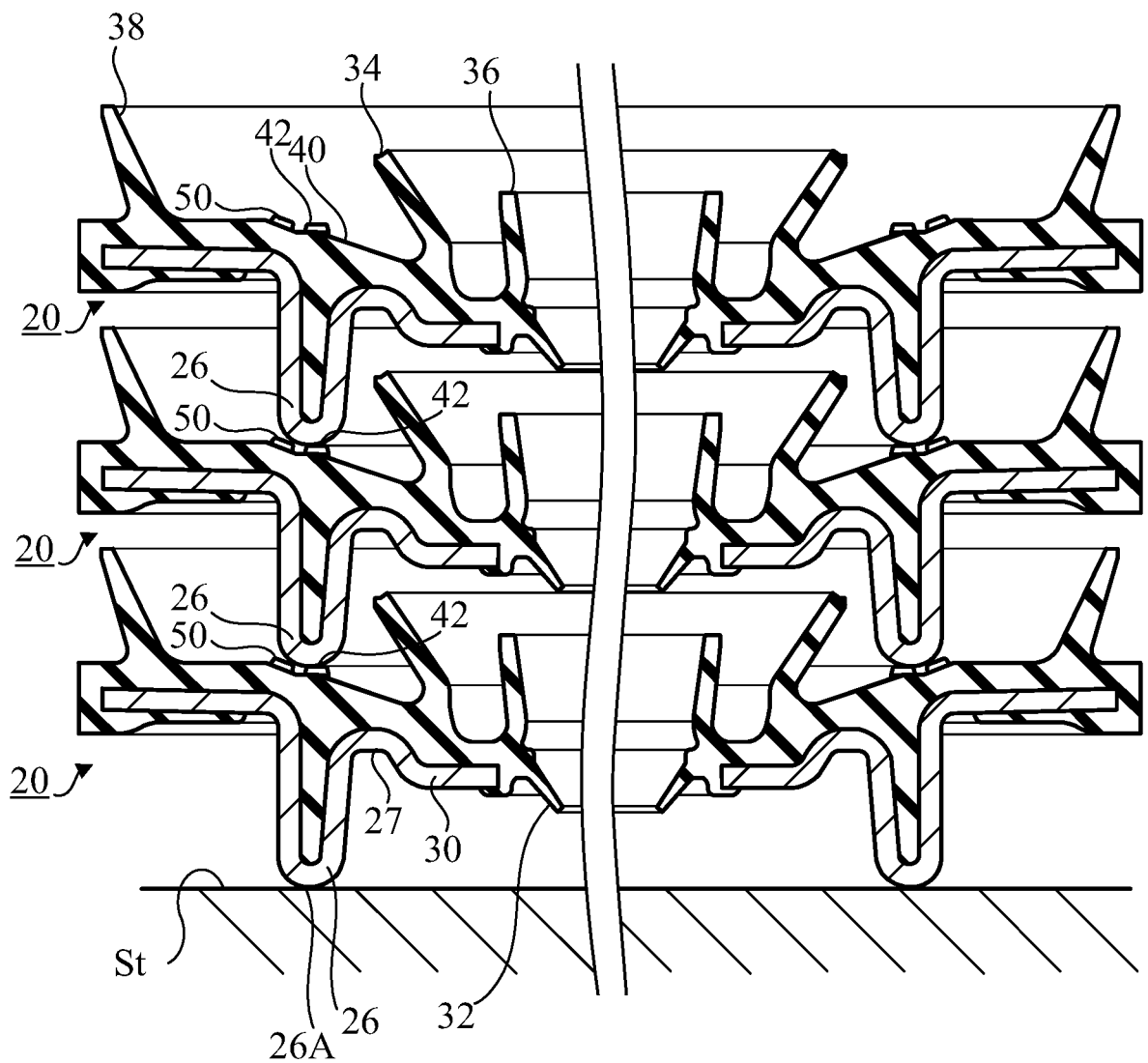
FIG. 19 is a cross-sectional view of the sealing devices according to the second embodiment when stacked.

As shown in FIG. 19, when multiple sealing devices 20 of the same type are stacked, the tubular part 26 of the upper sealing device 20 is surrounded by multiple second protrusions 50 located radially outside the protrusions 42 of the sealing device 20 immediately below. The diameter of the circle on which the multiple second protrusions 50 are arranged is greater than the diameter of the lower surface 26A of the tubular part 26. Accordingly, eccentricity of the sealing devices 20 is suppressed, so that the upper sealing device 20 is securely brought into contact with the distal ends of the protrusions 42 of the sealing device 20 immediately below and is stably supported.

Between the lower surface 26A of the tubular part 26 of the upper sealing device 20 and the upper surface 40 of the annular part 27 of the sealing device 20 immediately below, multiple protrusions 42 spaced apart from one another are interposed. Furthermore, multiple second protrusions 50 spaced apart from one another are interposed between the outer surface of the tubular part 26 of the upper sealing device 20 and the upper surface 40 of the annular part 27 of the sealing device 20 immediately below. Therefore, the contact area between the tubular part 26 of the upper sealing device 20 and the sealing device 20 immediately below is small. For this reason, it is difficult for the upper sealing device 20 to adhere to the sealing device 20 immediately below, and each sealing device 20 can be easily separated from other sealing devices 20.

In this embodiment, the lower surface 26A and the outer surface of the tubular part 26 are formed of the reinforcing ring 24 made of a rigid material. Therefore, when the multiple sealing devices 20 are stacked, the protrusions 42 and the second protrusions 50 formed of an elastic material, for example, elastomer, are unlikely to adhere to the lower surface 26A and the outer surface of the tubular part 26, so that each sealing device 20 can be more easily separated from the other sealing devices 20.

When multiple sealing devices 20 are stacked, the protrusions 42 of the lower sealing device 20 are compressed and deformed under the load of the upper sealing devices 20. The initial height H1 of the protrusions 42 is designed so that portions other than the protrusions 42, for example, the upper surface 40 of the inner annular part 30, are not in contact with the upper sealing device 20 even though the protrusions 42 are compressed and deformed.

In this embodiment, the second protrusions 50 of the lower sealing device 20 are also compressed and deformed under the load of the upper sealing devices 20. The initial height H2 of the second protrusions 50 is designed so that portions other than the protrusions 42 and the second protrusions 50 are not in contact with the upper sealing device 20 even though the second protrusions 50 are compressed and deformed.

As described above, each second protrusion 50 has a truncated cone shape. The diameter D1 of the distal end of each second protrusion 50 is greater than the height H2 of each second protrusion 50. Therefore, the amount of compressive deformation of the second protrusion 50 is suppressed when the load of the upper sealing devices 20 is received, so that it is possible to reduce or prevent the outer surface of the tubular part 26 of the upper sealing device 20 from being in surface contact with the upper surface 40 of the annular part 27 of the sealing device 20 immediately below. In addition, each second protrusion 50 is unlikely to collapse or buckle.

The diameter D1 of the distal end of each second protrusion 50 is less than the diameter D2 of the proximal end of each second protrusion 50. Therefore, each second protrusion 50 is unlikely to collapse or buckle.

Preferably, as shown in FIG. 8, a large number of minute convexities and concavities are irregularly formed on the distal end surface of each protrusion 42 with matte finish. Similarly, matte finish may also be made on the distal end surface of each second protrusion 50 so as to irregularly form a large number of minute convexities and concavities. The modifications of the protrusion 42 shown in FIGS. 9 to 13 may also be applied to the second protrusion 50.

Figure 20:
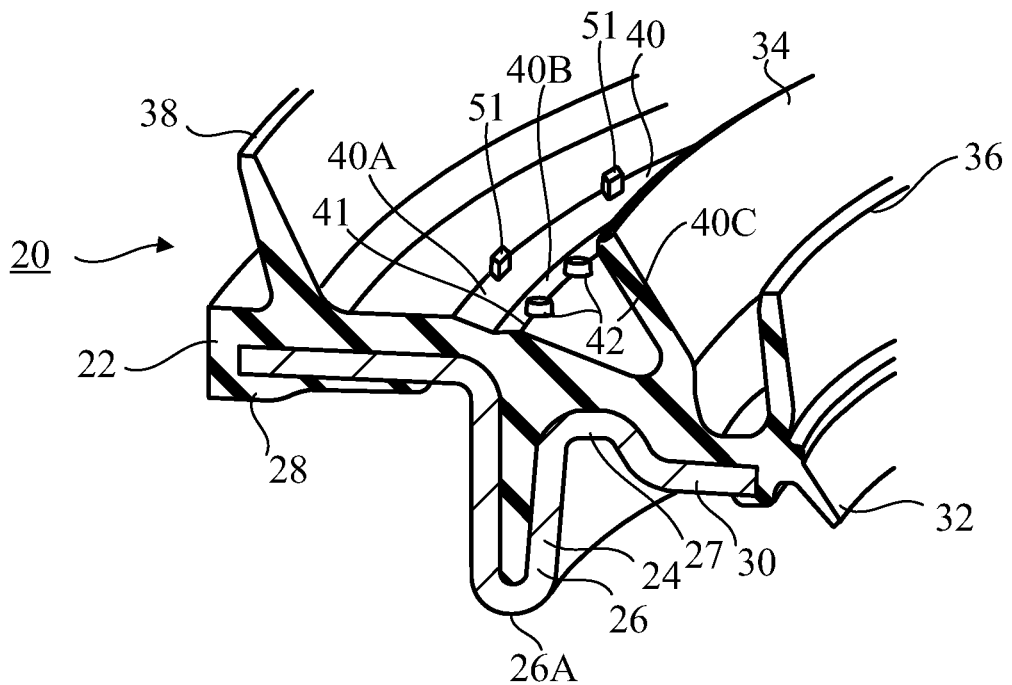
FIG. 20 is a perspective view of a sealing device according to a modification of the second embodiment in which a part is cutaway.

FIG. 20 is a perspective view of a sealing device according to a modification of the second embodiment in which a part is cutaway. The sealing device 20 is provided with multiple second protrusions 51 having shapes and dimensions different from those of the second protrusions 50. The second protrusions 51 are arranged radially outside the second protrusions 50, and when multiple sealing devices 20 are stacked, not all the second protrusions 51 are in contact with the outer surface of the tubular part 26 of the upper sealing device 20. In addition, the second protrusions 51 do not receive the load of the upper sealing devices 20 along the vertical direction.

Each second protrusion 51 has a substantially rectangular parallelepiped shape and has a protruding direction that is substantially parallel to the central axis Ax. In addition, the angular arrangement of the multiple second protrusions 51 around the central axis Ax is different from the angular arrangement of the multiple protrusions 42.

Although not shown, when multiple sealing devices 20 of the same type are stacked, the tubular part 26 of the upper sealing device 20 is surrounded by the multiple second protrusions 51 of the sealing device 20 immediately below. Accordingly, eccentricity of the sealing devices 20 is suppressed, so that the upper sealing device 20 is securely brought into contact with the distal ends of the protrusions 42 of the sealing device 20 immediately below and is stably supported.

In FIG. 20, the second protrusions 51 is formed on the inclined surface 40A of the upper surface 40 of the inner annular part 30. However, the second protrusions 51 may be formed on the upper surface of the outer annular part 28.

Figure 21:
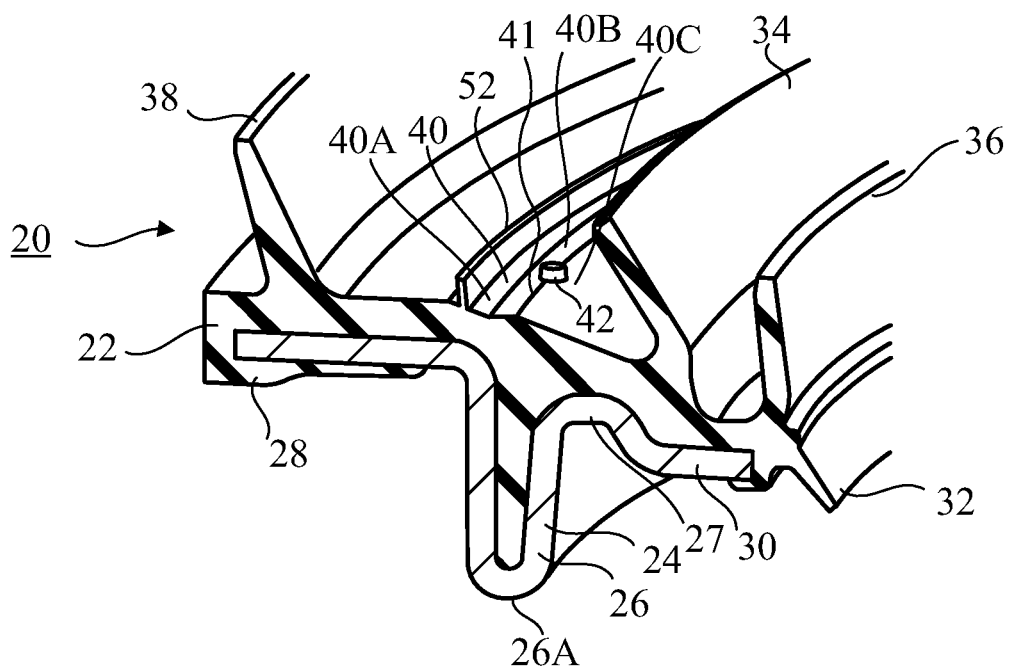
FIG. 21 is a perspective view of a sealing device according to another modification of the second embodiment in which a part is cutaway.
Figure 22:
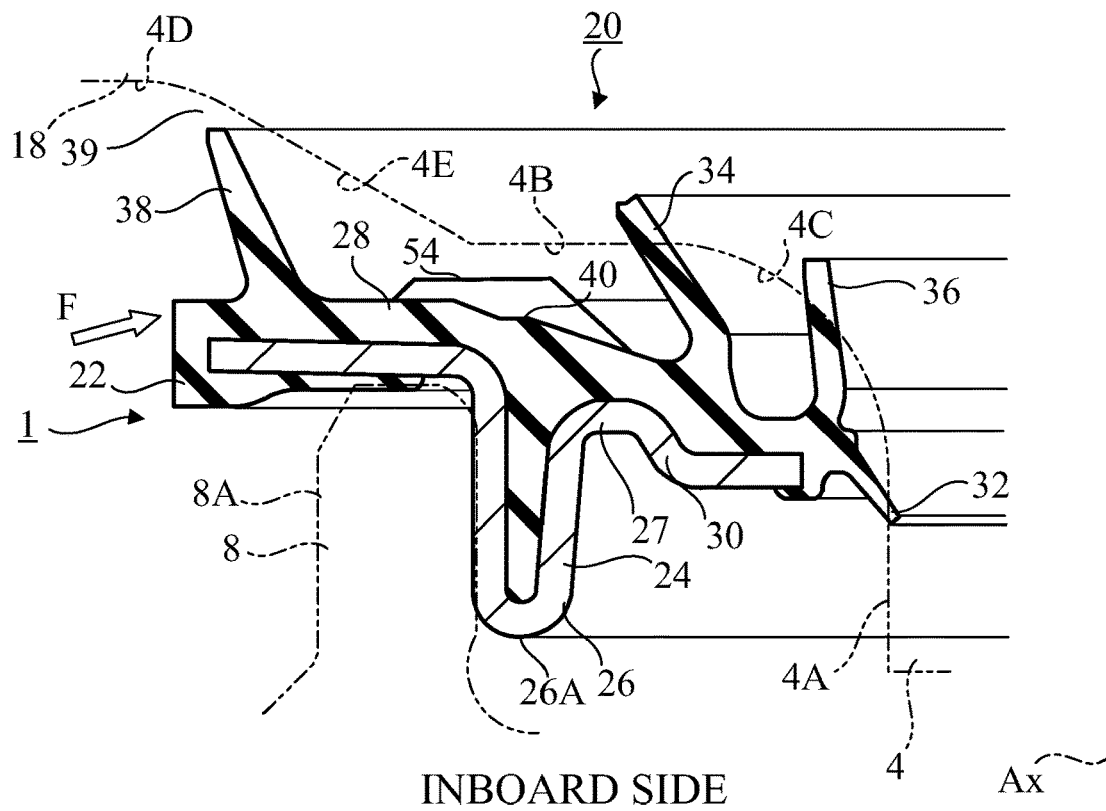
FIG. 22 is a partial cross-sectional view of a sealing device according to a third embodiment of the present invention.
Figure 23:
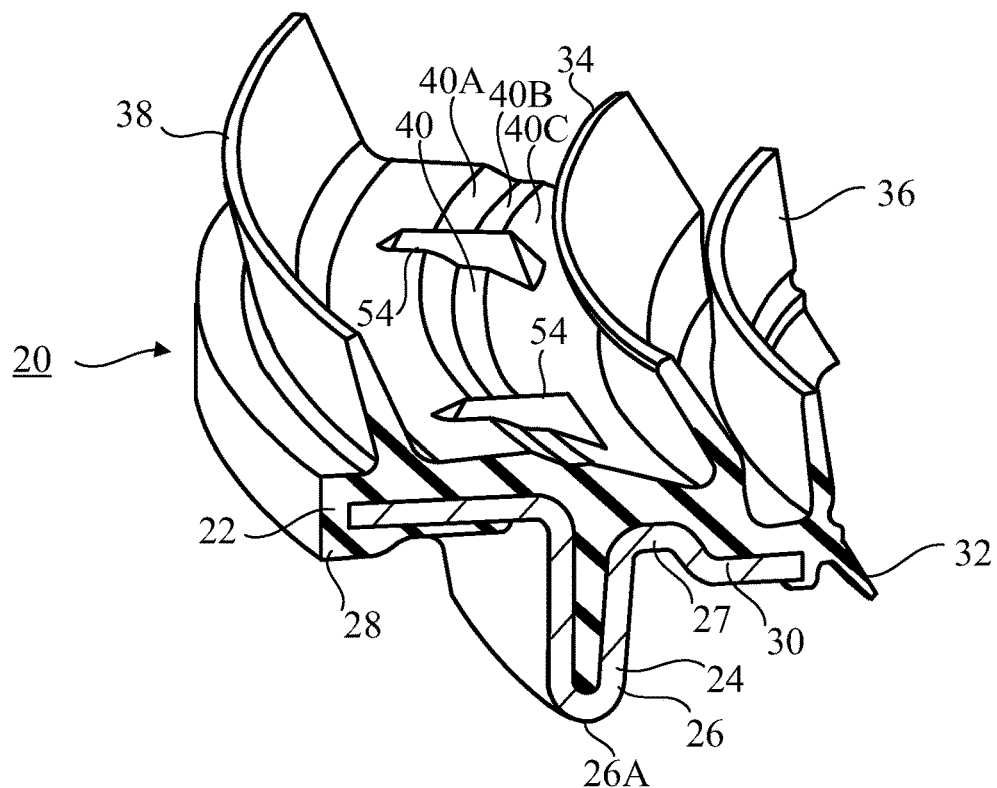
FIG. 23 is a perspective view of the sealing device according to the third embodiment in which a part is cutaway.

FIG. 21 is a perspective view in which a part of a sealing device according to another modification of the second embodiment is cutaway. The sealing device 20 is provided with a single annular second protrusion 52 instead of the multiple second protrusions. The second protrusion 52 is located radially outside the second protrusion 50, and when multiple sealing devices 20 are stacked, not all portions of the inner peripheral surface of the second protrusion 52 are in contact with the outer surface of the tubular part 26 of the upper sealing device 20. In addition, the second protrusion 52 does not receive the load of the upper sealing device 20 along the vertical direction.

The second protrusion 52 has a thin plate shape, and the protruding direction of the second protrusion 52 is substantially parallel to the central axis Ax. The second protrusion 52 is continuously located on a circle centered on the central axis Ax, which is radially outside the circle 41 on which the protrusions 42 are located.

Although not shown, when multiple sealing devices 20 of the same type are stacked, the tubular part 26 of the upper sealing device 20 is surrounded by the annular second protrusion 52 of the sealing device 20 immediately below. Accordingly, eccentricity of these sealing devices 20 is suppressed, so that the upper sealing device 20 is securely brought into contact with the distal ends of the protrusions 42 of the sealing device 20 immediately below and is stably supported.

In FIG. 21, the second protrusion 52 is formed on the inclined surface 40A of the upper surface 40 of the inner annular part 30. However, the second protrusion 52 may be formed on the upper surface of the outer annular part 28.

Third Embodiment

FIGS. 22 to 26 show a third embodiment of the present invention.

In this embodiment, multiple protrusions 54 are provided on the upper surface 40 of the inner annular part 30 instead of the multiple protrusions 42. Each protrusion 54 is formed of the same elastic material as that of the elastic ring 22. The multiple protrusions 54 are spaced apart from one another and are arranged on a circle centered on the central axis Ax, and protrude upward along the direction of the central axis Ax.

Although not shown, when multiple sealing devices 20 of the same type are stacked, the lower surface 26A of the tubular part 26 of the upper sealing device 20 is in contact with the multiple protrusions 54 formed on the upper surface 40 of the annular part 27 of the sealing device 20 immediately below, so that the total contact area between the tubular part 26 of the upper sealing device 20 and the sealing device 20 immediately below is small. For this reason, it is difficult for the upper sealing device 20 to adhere to the sealing device 20 immediately below, and each sealing device 20 can be easily separated from other sealing devices 20. The lower surface 26A of the tubular part 26 is formed of the rigid part, and when the multiple sealing devices 20 are stacked, the protrusions 42 formed of an elastic material, for example, an elastomer, are unlikely to adhere to the lower surface 26A of the tubular part 26, so that each sealing device 20 can be separated from other sealing devices 20 more easily.

Figure 24:
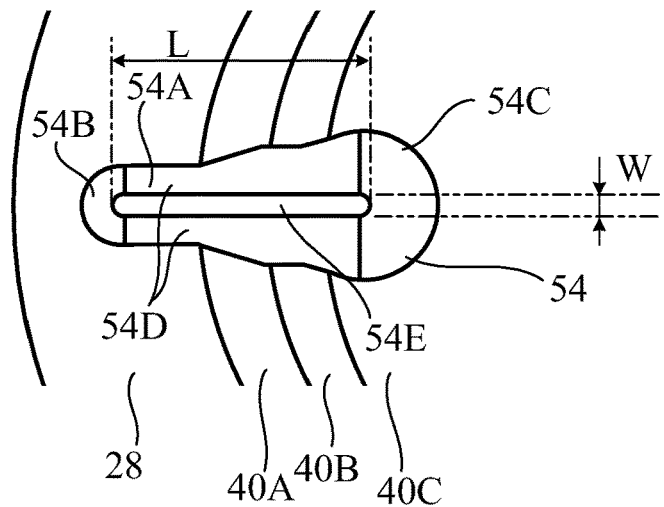
FIG. 24 is a plan view showing a protrusion of the sealing device according to the third embodiment.
Figure 25:
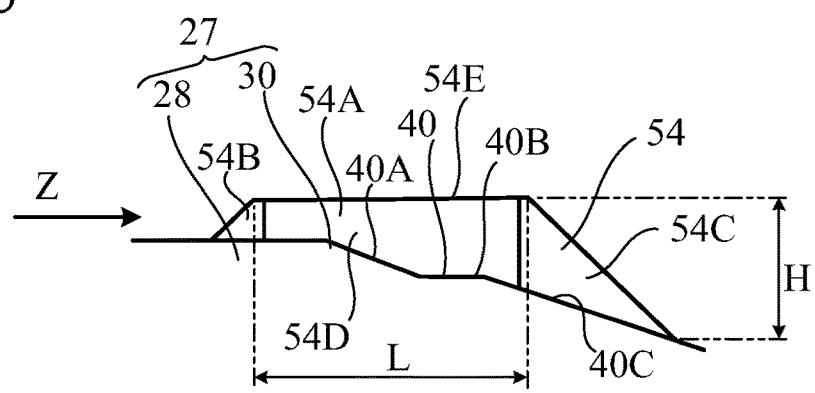
FIG. 25 is a side view showing the protrusion of the sealing device according to the third embodiment.

Each protrusion 54 extends in a radial direction of the sealing device 20 and is located on the upper surface of the outer annular part 28 and the upper surface 40 of the inner annular part 30 of the annular part 27. As shown in FIGS. 24 and 25, each protrusion 54 has a central portion 54A, an outer end portion 54B, and an inner end portion 54C. The central portion 54A is located at the center of the protrusion 54 in the radial direction of the sealing device 20, and is located on the upper surface of the outer annular part 28 and the upper surface 40 (including the inclined surface 40A, the flat surface 40B, and the inclined surface 40C) of the inner annular part 30. The outer end portion 54B is located radially outside the central portion 54A, and is located on the upper surface of the outer annular part 28. The inner end portion 54C is located radially inside the central portion 54A, and is located on the inclined surface 40C of the upper surface 40. The diameter of the circle on which the outer end portions 54B of the multiple protrusions 54 are arranged is greater than the diameter of the lower surface 26A of the tubular part 26, whereas the diameter of the circle on which the inner end portions 54C of the multiple protrusions 54 are arranged is less than the diameter of the lower surface 26A of the tubular part 26.

Figure 26:
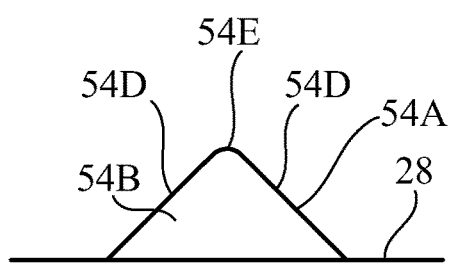
FIG. 26 is a view taken along line Z in FIG. 25 showing the protrusion of the sealing device according to the third embodiment.

As shown in FIG. 26, the central portion 54A is a tapered portion having a cross section that narrows toward the distal end. Specifically, the central portion 54A has a substantially isosceles triangular cross section, and has two inclined flat surfaces 54D and a distal end portion (top) 54E. As shown in FIG. 24, the distal end 54E is linear and extends perpendicular to the circle on which the protrusions 54 are arranged.

The outer end portion 54B is of a curved surface and smoothly continues to the two inclined flat surfaces 54D of the central portion 54A. The inner end portion 54C is also of a curved surface and smoothly continues to the two inclined flat surfaces 54D of the central portion 54A. The distal end 54E extends to a part of the outer end portion 54B and to a part of the inner end portion 54C.

The length L of the distal end 54E of each protrusion 54 in the radial direction of the sealing device 20 is much greater than the width W of the distal end 54E (the length on the circle on which each protrusion 54 is arranged). Therefore, when multiple sealing devices 20 are stacked, the upper sealing device 20 is securely brought into contact with the distal ends 54 of the respective protrusions 54 of the sealing device 20 immediately below and is stably supported even if the sealing devices 20 are eccentric or protrusions 54 have position errors. In addition, since the length L is much greater than the width W, each protrusion 54 has a high level of strength against forces in radial directions of the sealing device 20.

The length L of the distal end 54E of each protrusion 54 in the radial direction of the sealing device 20 is equal to or greater than the protruding amount of each protrusion 54 in the direction of the central axis Ax, i.e., the height H. Therefore, the amount of compressive deformation of the protrusions 54 can be suppressed when the load of the upper sealing devices 20 is received, so that it is possible to reduce or prevent the lower surface 26A of the tubular part 26 of the upper sealing device 20 from being in surface contact with the upper surface 40 of the annular part 27 of the sealing device 20 immediately below. In addition, since the length L is greater than or equal to the height H, each protrusion 54 is unlikely to collapse or buckle.

The radial length L of the sealing device 20 at the distal end 54E of each protrusion 54 is less than the radial length of the proximal end of each protrusion 54. Therefore, each protrusion 54 is unlikely to collapse or buckle.

Figure 27:
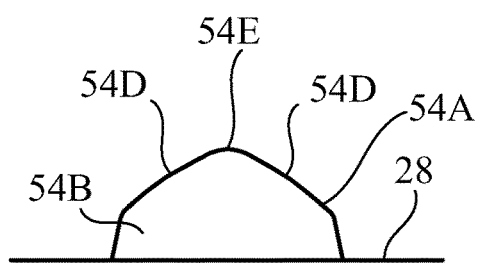
FIG. 27 is a view taken along line Z in FIG. 25 showing the protrusion according to a modification of the third embodiment.

The cross-sectional shape of the central portion 54A of the protrusion 54 is not limited to an isosceles triangle. The central portion 54A may have a substantially pentagonal cross section as shown in FIG. 27, or may have a dome-shaped (inverted U-shaped) cross section.

Each protrusion 54 extends along a radial direction of the sealing device 20, and the distal end 54E is orthogonal to the circle on which the protrusions 54 are arranged. However, each protrusion 54 may extend obliquely with respect to a radial direction of the sealing device 20, and the distal end 54E may obliquely intersect the circle on which the protrusions 54 are arranged.

Preferably, a large number of minute convexities and concavities may be irregularly formed on each protrusion 54, in particular, the distal end 54E, with matte finish. The multiple second protrusions 50 or protrusions 51, or the annular second protrusion 52 in the second embodiment or the modifications may also be provided in the third embodiment.

Fourth Embodiment

Figure 28:
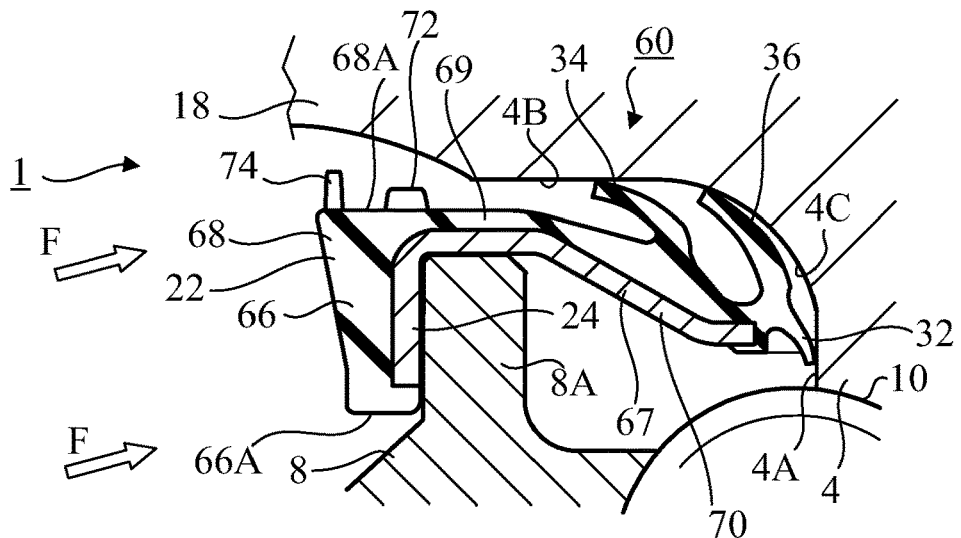
FIG. 28 is a partial sectional view of a sealing device according to a fourth embodiment of the present invention.
Figure 29:
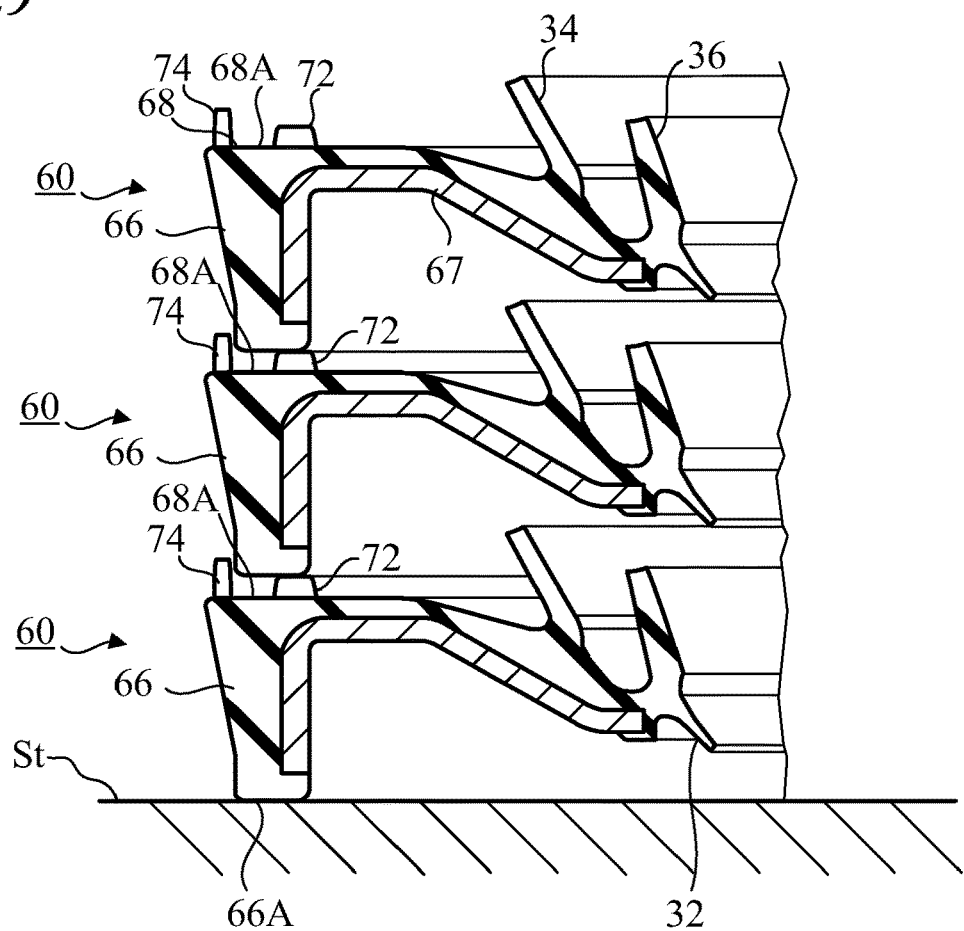
FIG. 29 is a partial cross-sectional view of the sealing devices according to the fourth embodiment when stacked.

FIGS. 28 and 29 show a fourth embodiment of the present invention. The sealing device 60 according to this embodiment includes a tubular part 66, an annular part 67, a radial lip 32, and two side lips 34 and 36. The sealing device 60 includes an elastic ring 22 made of an elastic material, for example, an elastomer, and a reinforcing ring 24 made of a rigid material, for example, a metal that reinforces the elastic ring 22. A part of the reinforcing ring 24 is embedded in the elastic ring 22, and is in close contact with the elastic ring 22.

The annular part 66 is a cylindrical part centered on the central axis Ax. In contrast to the tubular part 26 of the first to third embodiments, the cylindrical end portion 8A of the outer race 8 is fitted into the tubular part 66. The tubular part 66 is fixed to the end portion 8A. The fixing scheme is not limited, but may be, for example, an interference fit. That is, the end portion 8A may be press-fitted into the tubular part 66. The tubular part 66 is constituted of a tubular portion of the reinforcing ring 24 and an elastic ring 22 located around the tubular part. The tubular portion of the reinforcing ring 24 has the inner peripheral surface of the tubular part 66, and is in close contact with the outer peripheral surface of the end portion 8A by the interference fit. The lower surface 66A (surface opposite to the annular part 67) of the tubular part 66 is formed by the elastic ring 22.

The annular part 67 is connected to the upper end of the tubular part 66. The annular part 67 is also constituted of the elastic ring 22 and the reinforcing ring 24. Here, the annular part 67 is for convenience divided into three parts: an outer annular part 68, an intermediate annular part 69, and an inner annular part 70. The outer annular part 68 is a part directly above the tubular part 66, that is, a part outside the outer peripheral surface of the end portion 8A of the outer race 8. The intermediate annular part 69 is a part directly above the end portion 8A of the outer race 8, that is, a part inside the outer peripheral surface of the end portion 8A of the outer race 8 and outside the inner peripheral surface thereof. The inner annular part 70 is a part inside the inner peripheral surface of the end portion 8A.

In the intermediate annular part 69, the reinforcing ring 24 is brought into contact with the end face of the end portion 8A. The radial lip 32 and the side lips 34 and 36 extend from a portion of the inner annular part 70 corresponding to the elastic ring 22. In this embodiment, the auxiliary lip 38 is not provided, but the auxiliary lip 38 may be provided.

The upper surface 68A of the outer annular part 68 (the surface opposite to the tubular part 66) is formed of the elastic ring 22. The upper surface 68A is a flat surface and is flush with the upper surface of the intermediate annular part 69.

On the upper surface 68A, multiple protrusions 72 are formed of the same elastic material as that of the elastic ring 22. The protrusions 72 are spaced apart from one another and are arranged on a circle centered on the central axis Ax of the hub bearing 1 and the tubular part 66, and protrude upward in the direction of the central axis Ax. The protrusions 72 are not in contact with the hub 4 or the outer race 8 and do not have a sealing function or a function of protecting from foreign matter, in contrast to lips.

Each protrusion 72 has a truncated cone shape that is the same as the portion 42B of each protrusion 42 in the first embodiment. Accordingly, each protrusion 72 has a contour that narrows toward the distal end, and in each protrusion 72, the cross-sectional area on the distal end side (the area of the cross section perpendicular to the height direction of the protrusion 72) is less than the cross-sectional area on the proximal end side. The diameter of the distal end surface, i.e., the upper end surface of the protrusion 72 is less than the diameter of the proximal end, i.e., the lower end of the protrusion 72.

The height of each protrusion 72 is less than the minimum diameter (the diameter of the distal end surface) of the protrusion 72. The multiple protrusions 72 have the same size and the same shape, and the distal end surfaces of the multiple protrusions 72 are flush with one another.

Furthermore, on the upper surface 68A, multiple second protrusions 74 are formed of the same elastic material as that of the elastic ring 22. The multiple second protrusions 74 are also spaced apart from one another and are arranged on the circle centered on the central axis Ax, and protrude upward along the direction of the central axis Ax. The circle on which the multiple second protrusions 74 are located radially outside the circle on which the multiple protrusions 72 are arranged. The second protrusions 74 are not in contact with the hub 4 or the outer race 8 and do not have a sealing function or a function of protecting from foreign matter, in contrast to lips.

The multiple protrusions 72 may be arranged at equiangular intervals similarly to the protrusions 42 illustrated in FIG. 17, or may be arranged at unequal angular intervals similarly to the protrusions 42 illustrated in FIG. 18. The number and angular intervals of the protrusions 72 are not limited to the examples of FIGS. 17 and 18. However, in order to stably support the upper sealing devices 60, the number of the protrusions 72 is preferably at least three.

The multiple second protrusions 74 may be arranged at equiangular intervals similarly to the second protrusions 50 illustrated in FIG. 17, or may be arranged at unequal angular intervals similarly to the second protrusions 50 illustrated in FIG. 18. The number and angular intervals of the second protrusions 74 are not limited to the examples of FIGS. 17 and 18. In a case in which the second protrusions 74 receive the load of the upper sealing devices 20, the number of second protrusions 74 is preferably at least three in order to stably support the sealing devices 60 above.

FIG. 29 shows a state in which multiple sealing devices 60 of the same type are stacked on the stage St. When multiple sealing devices 60 of the same type are stacked, the lower surface 66A of the tubular part 66 of the upper sealing device 60 is placed on the upper surface 68A of the annular part 67 of the sealing device 60 immediately below. The upper surface 68A of the annular part 67 and the lower surface 66A of the tubular part 66 are formed of an elastic material that easily adheres to other objects. However, on the upper surface 68A of the annular part 67, multiple protrusions 72, which protrude along the direction of the central axis Ax, are formed and are spaced apart from one another. The protrusions 72 are formed at a position that will be in contact with the lower surface 66A of the tubular part 66 of the upper sealing device 60 when multiple sealing devices 60 are stacked. Therefore, the multiple protrusions 72 spaced apart from one another are interposed between the lower surface 66A of the tubular part 66 of the upper sealing device 60 and the upper surface 68A of the annular part 67 of the sealing device 60 immediately below, so that the total contact area between the tubular part 66 of the upper sealing device 60 and the sealing device 60 immediately below is small. For this reason, it is difficult for the sealing device 60 above to adhere to the sealing device 60 immediately below, and each sealing device 60 can be easily separated from other sealing devices 60.

Furthermore, when multiple sealing devices 60 of the same type are stacked, the tubular part 66 of the upper sealing device 60 is surrounded by multiple second protrusions 74 of the sealing device 60 immediately below. The second protrusion 74 is formed at a position that will be outside of the tubular part 66 of the upper sealing device 60 when multiple sealing devices 60 are stacked. Accordingly, eccentricity of the sealing devices 60 is suppressed, so that the upper sealing device 60 is securely brought into contact with the distal ends of the protrusions 72 of the sealing device 60 immediately below and is stably supported.

The length, orientation, and position of each of the lips 32, 34, 36, and 38 are designed so that the lips 32, 34, 36, and 38 are not in contact with other sealing devices 60 when the sealing devices 60 are stacked. In short, it is considered that when multiple sealing devices 60 are stacked, the lower surface 66A of the tubular part 66 of a sealing device 60 is brought into contact with the protrusion 72 formed on the upper surface 68A of the inner annular part 30 of another sealing device 60, but other portions are not in contact with one another.

When the sealing devices 60 are stacked, the protrusions 72 of the lower sealing device 60 are compressed and deformed under the load of the upper sealing devices 60. The initial height of the protrusions 72 is designed so that portions other than the protrusions 72, for example, the upper surface 68A of the inner annular part 30, are not in contact with the upper sealing device 60 even though the protrusions 72 are compressed and deformed.

As described above, each protrusion 72 has a truncated cone shape. Therefore, the length (diameter D1) of the distal end of each protrusion 72 in a radial direction of the sealing device 60 is equal to the length (diameter D1) of the distal end of each protrusion 72 in the circumferential direction on the circle on which the protrusions 72 are arranged. Since the length of the distal end of each protrusion 72 in a radial direction of the sealing device 60 is thus large, when multiple sealing devices 60 are stacked, the sealing device 60 above is securely brought into contact with the distal ends of the respective protrusions 72 of the sealing device 60 immediately below and is stably supported even if the sealing devices 60 are eccentric or protrusions 72 have position errors. Furthermore, since the length of the distal end of each protrusion 72 in a radial direction of the sealing device 60 is large relative to the length on the circle, each protrusion 72 has a high level of strength against forces in radial directions of the sealing device 60.

The diameter of the distal end of each protrusion 72 (the length of the distal end in a radial direction of the sealing device 60 and the length of the distal end on the circle) is greater than the height of each protrusion 72. Since the lengths in a radial direction and on the circle of the distal end of each protrusion 72 are thus large, the amount of compressive deformation of the protrusions 72 is suppressed when the load of the upper sealing devices 60 is received, so that it is possible to reduce or prevent the lower surface 66A of the tubular part 66 of the upper sealing device 60 from being in surface contact with the upper surface 68A of the annular part 67 of the sealing device 60 immediately below. In addition, since the radial length of the distal end of each protrusion 72 is large relative to the protruding amount in the axial direction, each protrusion 72 is unlikely to collapse or buckle.

The diameter of the distal end of each protrusion 72 (the lengths of the distal end in the radial direction of the sealing device 60 and on the circle) is less than the diameter of the proximal end of each protrusion 72 (the lengths of the proximal end in the radial direction of the sealing device 60 and on the circle). Therefore, each protrusion 72 is unlikely to collapse or buckle.

Preferably, a large number of minute convexities and concavities are irregularly formed on the distal end surface of each protrusion 72 with matte finish, similarly to the distal end surface of each protrusion 42 shown in FIG. 8. Similarly, matte finish may also be made on the distal end surface of each second protrusion 74 to irregularly form a large number of minute convexities and concavities. The modifications of the protrusion 42 shown in FIGS. 9 to 13 may also be applied to the protrusion 72 and the second protrusion 74.

In this embodiment, instead of the multiple second protrusions 74, a single annular second protrusion similar to the single annular second protrusion 52 shown in FIG. 21 may be provided. In this case, the tubular part 66 of the upper sealing device 60 is surrounded by the annular second protrusion of the sealing device 60 immediately below. Accordingly, eccentricity of the sealing devices 60 is suppressed, so that the upper sealing device 60 is securely brought into contact with the distal ends of the protrusions 72 of the sealing device 60 immediately below and is stably supported.

In this embodiment, the shape of each protrusion 72 may be modified to a shape similar to the protrusion 54 shown in FIGS. 22 to 27. In this case, the protrusion 72 will have a tapered portion having a cross-section that narrows toward the distal end (for example, an isosceles triangular cross-section), and the distal end in the taper portion will extend to intersect the circle on which the protrusions are arranged. Therefore, when multiple sealing devices 60 are stacked, the upper sealing device 60 is securely brought into contact with the distal ends of the respective protrusions 72 of the sealing device 60 immediately below and is stably supported even if the sealing devices 60 are eccentric or protrusions 72 have position errors. In addition, the amount of compressive deformation of the protrusions 72 is suppressed when the load of the upper sealing devices 60 is received, so that it is possible to reduce or prevent the lower surface 66A of the tubular part 66 of the upper sealing device 60 from being in surface contact with the upper surface 68A of the annular part 67 of the sealing device 60 immediately below. Furthermore, each protrusion 72 is unlikely to collapse or buckle.

Fifth Embodiment

Figure 30:
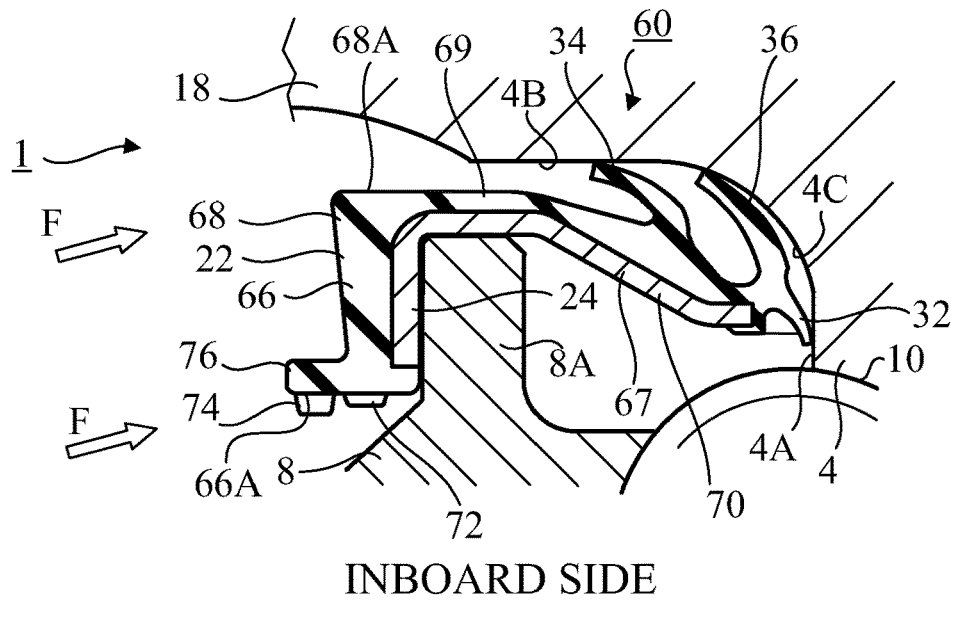
FIG. 30 is a partial sectional view of a sealing device according to a fifth embodiment of the present invention.
Figure 31:
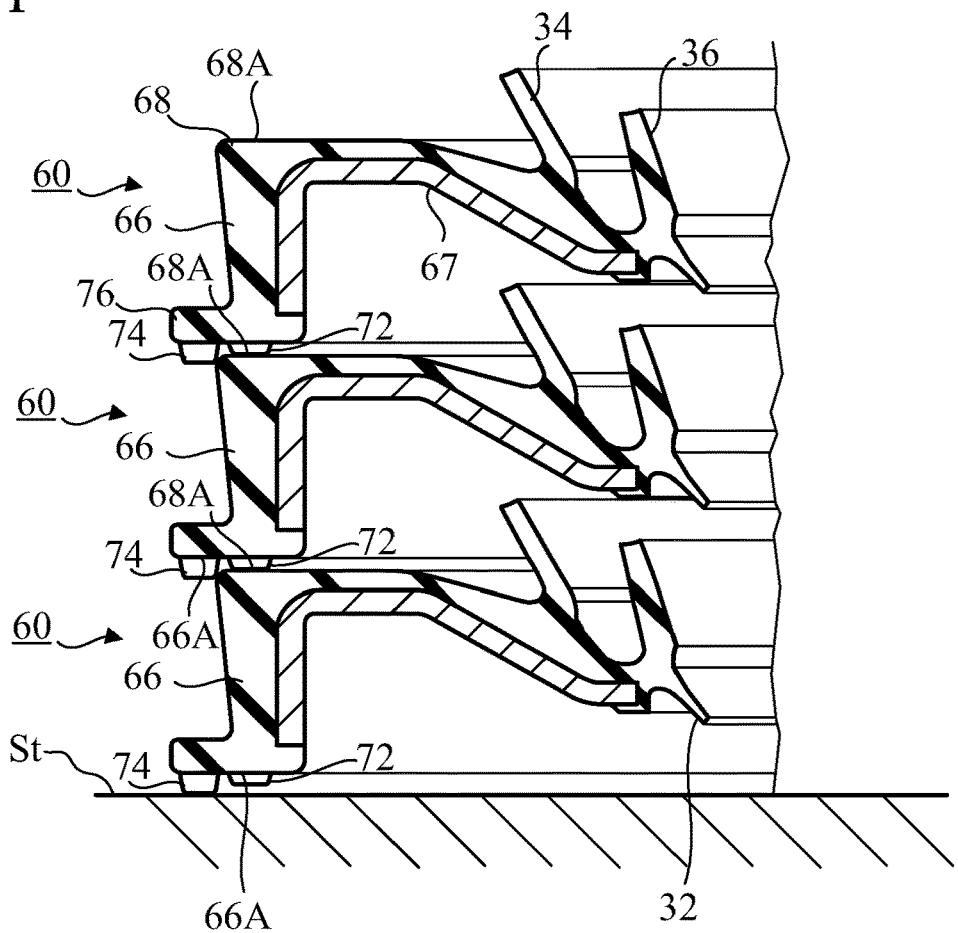
FIG. 31 is a partial cross-sectional view of the sealing devices according to the fifth embodiment when stacked.

FIGS. 30 and 31 show a fifth embodiment of the present invention. The fifth embodiment is a modification of the fourth embodiment.

A wide part 76 formed of the elastic ring 22 is provided at the lower end of the tubular part 66 of the sealing device 60, and multiple protrusions 72 and second protrusions 74 are arranged on the lower surface 66A of the wide part 76. That is, the multiple protrusions 72 and the second protrusions 74 formed on the upper surface 68A of the outer annular part 68 of the annular part 67 in the fourth embodiment are formed on the lower surface 66A of the tubular part 66 such that the multiple protrusions 72 and the second protrusions 74 protrude downward in this embodiment.

Other features are the same as those in the fourth embodiment, and the modifications related to the fourth embodiment can be applied to this embodiment.

FIG. 31 shows a state in which multiple sealing devices 60 of the same type are stacked on the stage St. When multiple sealing devices 60 of the same type are stacked, the lower surface 66A of the tubular part 66 of the upper sealing device 60 is placed on the upper surface 68A of the annular part 67 of the sealing device 60 immediately below. The upper surface 68A of the annular part 67 and the lower surface 66A of the tubular part 66 are formed of an elastic material that easily adheres to other objects. However, on the lower surface 66A of the tubular part 66, multiple protrusions 72, which protrude along the direction of the central axis Ax, are formed and are spaced apart from one another. The protrusions 72 are formed at a position that will be in contact with the upper surface 68A of the annular part 67 of the lower sealing device 60 when multiple sealing devices 60 are stacked. Therefore, the multiple protrusions 72 spaced apart from one another are interposed between the lower surface 66A of the tubular part 66 of the upper sealing device 60 and the upper surface 68A of the annular part 67 of the sealing device 60 immediately below, so that the total contact area between the tubular part 66 of the upper sealing device 60 and the sealing device 60 immediately below is small. For this reason, it is difficult for the sealing device 60 above to adhere to the sealing device 60 immediately below, and each sealing device 60 can be easily separated from other sealing devices 60.

Furthermore, when multiple sealing devices 60 of the same type are stacked, the annular part 67 of the lower sealing device 60 is surrounded by the multiple second protrusions 74 of the sealing device 60 immediately above. The second protrusion 74 is formed at a position that will be outside of the annular part 67 of the lower sealing device 60 when multiple sealing devices 60 are stacked. Accordingly, eccentricity of the sealing devices 60 is suppressed, so that the lower sealing device 60 is securely brought into contact with distal ends of the protrusions 72 of the sealing device 60 immediately above and the upper sealing device 60 is stably supported.

In this embodiment, instead of the multiple second protrusions 74, a single annular second protrusion may be provided. In this case, the annular part 67 of the lower sealing device 60 is surrounded by the annular second protrusion of the sealing device 60 immediately above. Accordingly, eccentricity of the sealing devices 60 is suppressed, so that the upper sealing device 60 is securely brought into contact with the distal ends of the protrusions 72 of the sealing device 60 immediately below and is stably supported.

In the fourth embodiment, the protrusions 72 and the second protrusions 74 are formed on the upper surface 68A of the outer annular part 68 of the annular part 67. In the fifth embodiment, the protrusions 72 and the second protrusions 74 are formed on the lower surface 66A of the tubular part 66. However, the protrusion 72 may be formed on the upper surface 68A of the outer annular part 68 of the annular part 67, whereas the second protrusions 74 may be formed on the lower surface 66A of the tubular part 66. The second protrusions 74 may be formed on the upper surface 68A of the outer annular part 68 of the annular part 67, whereas the protrusions 72 may be formed on the lower surface 66A of the tubular part 66.

Suitable Total Area of Protrusions

From the viewpoint of preventing the sealing devices from adhering to one another, experiments were conducted to investigate a suitable range of the total area of the protrusions of the sealing device. The sealing device used in the experiments was the sealing device 20 according to the first embodiment, in which each protrusion 42 had the shape shown in FIG. 4, and the distal end surface of each protrusions 42 was a flat surface that was not subjected to matte finish.

In the experiments, a large number of sealing devices of the same type were stacked as shown in FIG. 7 in an environment of 40 degrees Celsius, and a load was placed on the stacked sealing devices and left for 72 hours. Then, the adhesion state of the sealing devices after 72 hours was examined.

In the experiments, four types of sealing devices were used, as shown in FIG. 32. The first type does not have the protrusion 42. Accordingly, it was determined that the reference of the contact area ratio of the upper and lower sealing devices was based on the first type. The contact area of the upper and lower sealing devices, that is, the total contact area of portions at which the inclined surface 40A of the upper surface 40 of the lower sealing device was in contact with the lower surface 26A of the tubular part 26 of the upper sealing device was measured. The contact area ratio for the first type was defined as the ratio of the total area of the contact portions in the first type to the total area of the contact portions in the first type, and thus, was defined as 100%.

The second type has four protrusions 42 arranged at equiangular intervals of 90 degrees. In other words, four groups, each constituted of one protrusion 42, are arranged at equiangular intervals of 90 degrees. The contact area ratio was 5.0%. The contact area ratio for the second type is the ratio of the total area of the contact portions (the portions at which the distal end surfaces of the protrusions 42 were in contact with the lower surface 26A of the tubular part 26 of the upper sealing device) in the second type to the total area of the contact portions in the first type.

The second type has four protrusions 42 arranged at equiangular intervals of 90 degrees. In other words, four groups, each constituted of one protrusion 42, are arranged at equiangular intervals of 90 degrees. The contact area ratio was 5.0%. The contact area ratio for the second type is the ratio of the total area of the contact portions (the portions at which the distal end surfaces of the protrusions 42 were in contact with the lower surface 26A of the tubular part 26 of the upper sealing device) in the second type to the total area of the contact portions in the first type.

The third type has eight protrusions 42 arranged at equiangular intervals of 45 degrees (that is, the arrangement pattern shown in FIG. 5). In other words, eight groups, each constituted of one protrusion 42, are arranged at equiangular intervals of 45 degrees. The contact area ratio was 8.9%. The contact area ratio for the third type is the ratio of the total area of the contact portions (the portions at which the distal end surfaces of the protrusions 42 were in contact with the lower surface 26A of the tubular part 26 of the upper sealing device) in the third type to the total area of the contact portions in the first type.

The fourth type has 24 protrusions 42, i.e., eight groups, each consisting of three protrusions 42, the eight groups arranged at equiangular intervals of 45 degrees (that is, the arrangement pattern shown in FIG. 6). The contact area ratio was 19.3%. The contact area ratio for the fourth type is the ratio of the total area of the contact portions (the portions at which the distal end surfaces of the protrusions 42 were in contact with the lower surface 26A of the tubular part 26 of the upper sealing device) in the fourth type to the total area of the contact portions in the first type.

The material of the elastic ring 22, and thus the protrusions 42 of the sealing device, was nitrile rubber. The material of the reinforcing ring 24, and thus the annular part 26, was iron. On the surface of the tubular part 26 of each sealing device, the adhesive for bonding iron and nitrile rubber applied in the manufacturing process remained in a dry state.

The load used in the experiments was a large number of sealing devices of the same type. Specifically, in one analysis, 25 sealing devices 20 of the same type were stacked. That is, on the three lowermost sealing devices 20A, 20B, and 20C shown in FIG. 7, 22 sealing devices 20 (not shown) were stacked. The weight of each sealing device 20 was 0.0273 kgf, so that the upper load applied to the three sealing devices 20A, 20B, and 20C was 0.60 kgf.

In another analysis, 75 sealing devices 20 of the same type were stacked. That is, 72 sealing devices 20 (not shown) were stacked on the three lowermost sealing devices 20A, 20B, and 20C shown in FIG. 7. The upper load applied to the three sealing devices 20A, 20B, and 20C was 1.97 kgf.

Next, the experimental results will be described. In the table in FIG. 32, sample 1 is the third sealing device 20A from the bottom shown in FIG. 7, sample 2 is the second sealing device 20B from the bottom, and sample 3 is the lowest sealing device 20C.

For the first type, regardless of whether the load is 0.60 kgf or 1.97 kgf, when sample 1 (sealing device 20A) was lifted, sample 2 (sealing device 20B) was raised adhering to sample 1 (sealing device 20A), and sample 3 (sealing device 20C) was also raised adhering to sample 2 (sealing device 20B). Accordingly, it is estimated that an adhesion force greater than the weight of the two samples 2 and 3 (0.0546 kgf=0.535N) acted on sample 1.

For the second type and the third type, regardless of whether the load was 0.60 kgf or 1.97 kgf, although sample 1 (sealing device 20A) was lifted, sample 2 (sealing device 20B) was not raised. Thereafter, although sample 2 (sealing device 20B) was lifted, sample 3 (sealing device 20C) was not raised. Accordingly, it is estimated that the adhesion force acting on each sample was less than the weight of one sample (0.0273 kgf=0.268 N).

For the fourth type, in a case in which the load was 0.60 kgf, when sample 1 was lifted, sample 2 was raised adhering to sample 1, and sample 3 was also raised adhering to sample 2. In a case in which the load was 1.97 kgf, when sample 1 was lifted, sample 2 was often not raised, but when sample 2 was lifted after sample 1 was separated from sample, sample 3 was raised adhering to sample 2. Accordingly, it is estimated that the adhesion force acting on each sample was less than the weight of two samples and greater than the weight of one sample.

From the above results alone, the contact area ratio is preferably 5.0% (second type) or more and 19.3% (fourth type) or less, and is more preferably 5.0% or more and 8.9% (third type) or less. However, the number of types used in the experiments was small. It is considered that even if the contact area ratio is less than 5.0%, the upper and lower sealing devices often do not adhere to each other by virtue of the protrusions 42. However, if the contact area ratio is less than 4.0%, the protrusions 42 may be squashed by compression under the load, so that the contact area ratio may be 100%, and the stability of the stacked sealing devices 20 will be impaired (the stacked sealing devices 20 are likely to collapse).

Furthermore, from the results of the third type and the fourth type, it is considered that even if the contact area ratio is 10% or 15% between those of the third type and the fourth type, similar results as those of the third type will be obtained.

Therefore, it is considered that the contact area ratio (ratio of the total contact area of the subject upper and lower sealing devices to the total contact area of the upper and lower sealing devices for which it is assumed that there is no protrusion 42) is preferably greater than zero % and is equal to or less than 15%, and is more preferably greater than 4.0% and is equal to or less than 10%. The sealing devices used in the experiments were sealing devices 20 according to the first embodiment, but the preferred contact area ratio is considered to be applicable to other embodiments.

As described above, in order to stably support the upper sealing devices 20, the number of the protrusions 42 is preferably at least three. Furthermore, the number of protrusions 42 is more preferably at least five. This is because when the sealing devices 20, each having four protrusions 42 arranged at equiangular intervals of 90 degrees, are stacked such that the protrusions of the upper and lower multiple sealing devices 20 are generally aligned vertically, the balance of the stacked sealing devices 20 is likely to be lost due to mutual eccentricity of the sealing devices 20.

Other Modifications

Although embodiments of the present invention has been described, the foregoing description is not intended to limit the present invention. Various modifications including omission, addition, and substitution of structural elements may be made within the scope of the present invention.

For example, in the above-described embodiment and modifications, the hub 4 and the inner race 6 that are inner members are rotating members, and the outer race 8 that is an outer member is a stationary member. However, the present invention is not limited to the above embodiment and modifications, and can be applied to sealing multiple members that rotate relative to each other. For example, the inner members may be stationary, and the outer member may rotate, or all of these members may rotate.

In the above-described embodiment and modifications, a single reinforcing ring 24 is provided in each sealing device. However, the sealing device may have an outer rigid ring and an inner rigid ring that are separated from each other in radial directions. In this case, the outer rigid ring and the inner rigid ring can be relatively displaced in radial directions. Therefore, the amount of elastic deformation in radial directions of at least a part of the elastic ring can be increased. For this reason, even if a part of a rolling bearing is eccentric or is not perfectly round, the sealing device can have high sealing capability.

The use of the present invention is not limited to sealing of the hub bearing 1. For example, the sealing device or the sealing structure according to the present invention may be applied to a differential gear mechanism or other power transmission mechanism of an automotive vehicle, a bearing or other support mechanism of a drive shaft of an automotive vehicle, or a bearing or other support mechanism of a rotary shaft of a pump.

Clauses of the Present Invention

Clauses recognized by the applicant as inventions are listed below.

Clause 1. A sealing device located between an inner member and an outer member that rotate relative to each other, for sealing a gap between the inner member and the outer member, the sealing device comprising:

a tubular part having a central axis and for being mounted on a cylindrical end portion of the outer member;

an annular part connected to an end of the tubular part and having a portion located radially inside the end portion of the outer member; and at least one lip extending from the annular part toward the inner member, each of the annular part and the tubular part comprising an elastic part made of an elastic material and a rigid part made of a rigid material, at least one of an upper surface of the annular part that is opposite to the tubular part and a lower surface of the tubular part that is opposite to the annular part being formed of the elastic part, multiple protrusions being formed on at least one of the upper surface of the annular part and the lower surface of the tubular part, the protrusions protruding along an axial direction of the sealing device, the multiple protrusions being arranged on a circle centered on the central axis and spaced apart from each other.

In this clause, when a plurality of sealing devices of the same type are stacked, the lower surface of the tubular part of an upper sealing device is placed on the upper surface of the annular part of the sealing device immediately below. At least one of the upper surface of the annular part and the lower surface of the tubular part is formed of an elastic material that easily adheres to other objects. However, multiple protrusions, which protrude along an axial direction of the sealing device and are spaced apart from each other, are formed on the upper surface of the annular part and the lower surface of the tubular part. Accordingly, a plurality of protrusions spaced apart from each other are interposed between the lower surface of the tubular part of the upper sealing device and the upper surface of the annular part of the sealing device immediately below, so that the total contact area of the upper sealing device and the sealing device immediately below is small. For this reason, it is difficult for the upper sealing device to adhere to the sealing device immediately below, and each sealing device can be easily separated from other sealing devices.

Clause 2. The sealing device according to clause 1, wherein the tubular part is to be fitted into the cylindrical end portion of the outer member, and is to be in contact with an inner peripheral surface of the end portion, the upper surface of the annular part being formed of the elastic part, the multiple protrusions being formed on the upper surface.

In this case, when multiple sealing devices of the same type are stacked, the lower surface of the tubular part of the upper sealing device is brought into contact with the multiple protrusions formed on the upper surface of the annular part of the sealing device immediately below, the total contact area of the tubular part of the upper sealing device and the sealing device immediately below is small. For this reason, it is difficult for the upper sealing device to adhere to the sealing device immediately below, so that each sealing device can be easily separated from the other sealing devices.

Clause 3. The sealing device according to clause 2, wherein the lower surface of the tubular part is formed of the rigid part.

In this case, when multiple sealing devices of the same type are stacked, the protrusions formed of an elastic material are unlikely to adhere to the lower surface of the tubular part, so that each sealing device can be more easily separated from other sealing devices.

Clause 4. The sealing device according to clause 2 or 3, wherein multiple second protrusions are formed on the upper surface of the annular part, the multiple second protrusions being arranged on a circle that is centered on the central axis and that is radially outside the circle on which the protrusions are arranged, the multiple second protrusions being spaced apart from each other.

In this case, when multiple sealing devices of the same type are stacked, the tubular part of the upper sealing device is surrounded by multiple second protrusions located radial outside of the protrusions of the sealing device immediately below. Accordingly, eccentricity of the sealing devices is suppressed, so that the upper sealing device is securely brought into contact with the distal ends of the protrusions of the sealing device immediately below and is stably supported.

Clause 5. The sealing device according to clause 2 or 3, wherein an annular second protrusion is formed on the upper surface of the annular part, the second protrusion being continuously arranged on a circle that is centered on the central axis and that is radially outside the circle on which the protrusions are arranged.

In this case, when multiple sealing devices of the same type are stacked, the tubular part of the upper sealing device is surrounded by the annular second protrusion located radial outside of the protrusions of the sealing device immediately below. Accordingly, eccentricity of the sealing devices is suppressed, so that the upper sealing device is securely brought into contact with the distal ends of the protrusions of the sealing device immediately below and is stably supported.

Clause 6. The sealing device according to clause 1, wherein the cylindrical end portion of the outer member is to be fitted into the tubular part, the tubular part for being in contact with an outer peripheral surface of the end portion, the upper surface of the annular part and the lower surface of the tubular part being formed of the elastic part, the multiple protrusions being formed on at least one of the upper surface and the lower surface.

In this case, when multiple sealing devices of the same type are stacked, the multiple protrusions spaced apart from one another are interposed between the lower surface of the tubular part of the upper sealing device and the upper surface of the annular part of the sealing device immediately below, the total contact area of the tubular part of the upper sealing device and the sealing device immediately below is small. For this reason, it is difficult for the upper sealing device to adhere to the sealing device immediately below, so that each sealing device can be easily separated from other sealing devices.

Clause 7. The sealing device according to clause 6, wherein multiple second protrusions are formed on at least one of the upper surface of the annular part and the lower surface of the tubular part, the multiple second protrusions being arranged on a circle that is centered on the central axis and that is radially outside the circle on which the protrusions are arranged, the multiple second protrusions being spaced apart from each other.

If multiple second protrusions are formed on the upper surface of the annular part, when multiple sealing devices of the same type are stacked, the tubular part of the upper sealing device is surrounded by the multiple second protrusions formed on the upper surface of the annular part of the sealing device immediately below. If multiple second protrusions are formed on the lower surface of the tubular part, when multiple sealing devices of the same type are stacked, the annular part of the lower sealing device is surrounded by the multiple second protrusions formed on the lower surface of the tubular part of the sealing device immediately above. Accordingly, in either case, eccentricity of sealing devices is suppressed, so that each protrusion is securely interposed between the lower surface of the tubular part of the upper sealing device and the upper surface of the annular part of the sealing device immediately below, and the upper sealing device is stably supported.

Clause 8. The sealing device according to clause 6, wherein an annular second protrusion is formed on at least one of the upper surface of the annular part and the lower surface of the tubular part, the second protrusion being continuously arranged on a circle that is centered on the central axis and that is radially outside the circle on which the protrusions are arranged.

If an annular second protrusion is formed on the upper surface of the annular part, when multiple sealing devices of the same type are stacked, the tubular part of the upper sealing device is surrounded by the annular second protrusion formed on the upper surface of the annular part of the sealing device immediately below. If annular second protrusion is formed on the lower surface of the tubular part, when multiple sealing devices of the same type are stacked, the annular part of the lower sealing device is surrounded by the annular second protrusion formed on the lower surface of the tubular part of the sealing device immediately above. Accordingly, in either case, eccentricity of the sealing devices is suppressed, so that each protrusion is securely interposed between the lower surface of the tubular part of the upper sealing device and the upper surface of the annular part of the sealing device immediately below, and the upper sealing device is stably supported.

Clause 9. The sealing device according to any one of clauses 1-8, wherein a length of a distal end of each protrusion in a radial direction of the sealing device is equal to or greater than a length of the distal end of each protrusion in a circumferential direction.

In this case, since the length of the distal end of each protrusion in a radial direction of the sealing device is large, when multiple sealing devices are stacked, the sealing device is securely brought into contact with the distal ends of the respective protrusions of the closest sealing device and the upper sealing device is stably supported even if the sealing devices are eccentric or protrusions have position errors. In addition, since the length of the distal end of each protrusion in a radial direction of the sealing device is large relative to the length in the circumferential direction, each protrusion has a high level of strength against forces in radial directions of the sealing device.

Clause 10. The sealing device according to any one of clauses 1-9, wherein a length of a distal end of each protrusion in a radial direction of the sealing device is equal to or greater than a protruding amount of each protrusion along the axial direction.

In this case, since the length of the distal end of each protrusion in a radial direction is large, the amount of compressive deformation of the protrusions is suppressed when the load of the upper sealing devices is received, so that it is possible to reduce or prevent the lower surface of the tubular part of the upper sealing device from being in surface contact with the upper surface of the annular part of the sealing device immediately below. In addition, since the radial length of the distal end of each protrusion is large relative to the protruding amount in the axial direction, each protrusion is unlikely to collapse or buckle.

Clause 11. The sealing device according to any one of clauses 1-10, wherein a length of a distal end of each protrusion in a radial direction of the sealing device is less than a length of a proximal end of each protrusion in the radial direction.

In this case, each protrusion is unlikely to collapse or buckle.

Clause 12. The sealing device according to any one of clauses 1-9, wherein a length of a distal end of each protrusion in a radial direction of the sealing device and a length of a distal end of each protrusion in a circumferential direction are equal to or greater than a protruding amount of each protrusion along the axial direction.

In this case, since the lengths of the distal end of each protrusion in a radial direction and in the circumferential direction are large, the amount of compressive deformation of the protrusions is suppressed when the load of the upper sealing devices is received, so that it is possible to reduce or prevent the lower surface of the tubular part of the upper sealing device from being in surface contact with the upper surface of the annular part of the sealing device immediately below. In addition, since the lengths of the distal end of each protrusion in the radial direction and in the circumferential direction is large relative to the protruding amount in the axial direction, each protrusion is unlikely to collapse or buckle.

Clause 13. The sealing device according to any one of clauses 1-9 and 12, wherein a length of a distal end of each protrusion in a radial direction of the sealing device is less than a length of a proximal end of each protrusion in the radial direction, a length of the distal end of each protrusion in a circumferential direction is less than a length of the proximal end in the circumferential direction.

In this case, each protrusion is unlikely to collapse or buckle.

Clause 14. The sealing device according to any one of clauses 1-11, wherein each protrusion has a tapered portion having a cross section narrowing toward a distal end, the distal end in the tapered portion extends across the circle.

In this case, since the distal end of each protrusion extends across the circumferential direction of the circle, the length of the distal end of each protrusion in a radial direction of the sealing device is large. Accordingly, when multiple sealing devices are stacked, the sealing device is securely brought into contact with the distal ends of the respective protrusions of the closest sealing device and the upper sealing device is stably supported even if the sealing devices are eccentric or protrusions have position errors. In addition, since the length of the distal end of each protrusion in a radial direction of the sealing device is large, each protrusion has a high level of strength against forces in radial directions of the sealing device. Furthermore, since at the tapered portion, the width of the distal end of each protrusion is less than the width of the proximal end of each protrusion, each protrusion is unlikely to collapse or buckle.

Clause 15. The sealing device according to any one of clauses 1-14, wherein when multiple sealing devices of the same type are stacked, a ratio of a total contact area of upper and lower sealing devices having the protrusions to a contact area of upper and lower sealing devices that do not have the protrusions is greater than zero % and is equal to or less than 15%.

Clause 16. The sealing device according to any one of clauses 1-14, wherein when multiple sealing devices of the same type are stacked, a ratio of a total contact area of upper and lower sealing devices having the protrusions to a contact area of upper and lower sealing devices that do not have the protrusions is greater than 4.0% and is equal to or less than 10%.

According to clause 15 or 16, the upper and lower sealing device are unlikely to adhere to each other.

The invention claimed is:

1. A sealing device located between an inner member and an outer member that rotate relative to each other, for sealing a gap between the inner member and the outer member, the sealing device comprising:
   a tubular part having a central axis and for being mounted on a cylindrical end portion of the outer member;
   an annular part connected to an end of the tubular part and having a portion located radially inside the end portion of the outer member; and
   at least one lip extending from the annular part toward the inner member,
   each of the annular part and the tubular part comprising an elastic part made of an elastic material and a rigid part made of a rigid material,
   at least one of an upper surface of the annular part that is opposite to the tubular part and a lower surface of the tubular part that is opposite to the annular part being formed of the elastic part,
   multiple protrusions being formed on at least one of the upper surface of the annular part and the lower surface of the tubular part, the protrusions protruding along an axial direction of the sealing device, the multiple protrusions being arranged on a circle centered on the central axis and spaced apart from each other, wherein a length of a distal end of each protrusion in a radial direction of the sealing device is equal to or greater than a protruding amount of each protrusion along the axial direction.

2. The sealing device according to claim 1, wherein the tubular part is to be fitted into the cylindrical end portion of the outer member, and is to be in contact with an inner peripheral surface of the end portion, the upper surface of the annular part being formed of the elastic part, the multiple protrusions being formed on the upper surface.

3. The sealing device according to claim 2, wherein the lower surface of the tubular part is formed of the rigid part.

4. The sealing device according to claim 2, wherein multiple second protrusions are formed on the upper surface of the annular part, the multiple second protrusions being arranged on a circle that is centered on the central axis and that is radially outside the circle on which the protrusions are arranged, the multiple second protrusions being spaced apart from each other.

5. The sealing device according to claim 2, wherein an annular second protrusion is formed on the upper surface of the annular part, the second protrusion being continuously arranged on a circle that is centered on the central axis and that is radially outside the circle on which the protrusions are arranged.

6. The sealing device according to claim 1, wherein the cylindrical end portion of the outer member is to be fitted into the tubular part, the tubular part for being in contact with an outer peripheral surface of the end portion, the upper surface of the annular part and the lower surface of the tubular part being formed of the elastic part, the multiple protrusions being formed on at least one of the upper surface and the lower surface.

7. The sealing device according to claim 6, wherein multiple second protrusions are formed on at least one of the upper surface of the annular part and the lower surface of the tubular part, the multiple second protrusions being arranged on a circle that is centered on the central axis and that is radially outside the circle on which the protrusions are arranged, the multiple second protrusions being spaced apart from each other.

8. The sealing device according to claim 6, wherein an annular second protrusion is formed on at least one of the upper surface of the annular part and the lower surface of the tubular part, the second protrusion being continuously arranged on a circle that is centered on the central axis and that is radially outside the circle on which the protrusions are arranged.

9. The sealing device according to claim 1, wherein a length of a distal end of each protrusion in a radial direction of the sealing device is equal to or greater than a length of the distal end of each protrusion in a circumferential direction.

10. The sealing device according to claim 1, wherein a length of a distal end of each protrusion in a radial direction of the sealing device is less than a length of a proximal end of each protrusion in the radial direction.

11. The sealing device according to claim 1, wherein each protrusion has a tapered portion having a cross section narrowing toward a distal end, and the distal end in the tapered portion extends across the circle.

12. A sealing device located between an inner member and an outer member that rotate relative to each other for sealing a gap between the inner member and the outer member, the sealing device comprising:

a tubular part having a central axis and for being mounted on a cylindrical end portion of the outer member;

an annular part connected to an end of the tubular part and having a portion located radially inside the end portion of the outer member; and at least one lip extending from the annular part toward the inner member, each of the annular part and the tubular cart comprising an elastic part made of an elastic material and a rigid part made of a rigid material, at least one of an upper surface of the annular part that is opposite to the tubular part and a lower surface of the tubular part that is opposite to the annular part being formed of the elastic part, multiple protrusions being formed on at least one of the upper surface of the annular part and the lower surface of the tubular part, the protrusions protruding along an axial direction of the sealing device, the multiple protrusions being arranged on a circle centered on the central axis and spaced apart from each other, wherein a length of a distal end of each protrusion in a radial direction of the sealing device and a length of a distal end of each protrusion in a circumferential direction are equal to or greater than a protruding amount of each protrusion along the axial direction.

13. A sealing device located between an inner member and an outer member that rotate relative to each other, for sealing a gap between the inner member and the outer member, the sealing device comprising:

a tubular part having a central axis and for being mounted on a cylindrical end portion of the outer member, an annular part connected to an end of the tubular art and having a portion located radially inside the end portion of the outer member; and at least one lip extending from the annular part toward the inner member, each of the annular part and the tubular part comprising an elastic part made of an elastic material and a rigid part made of a rigid material, at least one of an upper surface of the annular part that is opposite to the tubular part and a lower surface of the tubular part that is opposite to the annular part being formed of the elastic part, multiple protrusions being formed on at least one of the upper surface of the annular part and the lower surface of the tubular part, the protrusions protruding along an axial direction of the sealing device, the multiple protrusions being arranged on a circle centered on the central axis and spaced apart from each other, wherein a length of a distal end of each protrusion in a radial direction of the sealing device is less than a length of a proximal end of each protrusion in the radial direction, and a length of the distal end of each protrusion in a circumferential direction is less than a length of the proximal end in the circumferential direction.

14. A sealing device located between an inner member and an outer member that rotate relative to each other, for sealing a gap between the inner member and the outer member, the sealing device comprising: a tubular part having a central axis and for being mounted on a cylindrical end portion of the outer member; an annular part connected to an upper end of the tubular part and having a portion located radially inside the end portion of the outer member; and at least one lip extending from the annular part toward the inner member, each of the annular part and the tubular part comprising an elastic part made of an elastic material and a rigid part made of a rigid material, the annular part comprising an upper surface that is opposite to the tubular part and that is formed of the elastic part, the tubular part comprising a lower bent surface that is opposite to the annular part, the lower bent surface being convexly bent and protrude downward, multiple protrusions being formed on the upper surface of the annular part, the protrusions protruding along an axial direction of the sealing device, the multiple protrusions being arranged on a circle centered on the central axis and spaced apart from each other, the protrusions overlapping the lower bent surface of the tubular part along the axial direction of the sealing device, and wherein the lower bent surface of the tubular part is approximately semicircular in cross section and has a lowermost portion, and wherein each of the protrusions has a center axis substantially aligned with the lowermost portion of the lower bent surface of the tubular part along the axial direction of the sealing device.

* * * * *